(12) United States Patent
Tamaki et al.

(10) Patent No.: US 9,696,078 B2
(45) Date of Patent: Jul. 4, 2017

(54) REFRIGERATION CYCLE APPARATUS

(71) Applicant: Mitsubishi Electric Corporation, Tokyo (JP)

(72) Inventors: Shogo Tamaki, Tokyo (JP); Kazuyoshi Shinozaki, Cypress, CA (US)

(73) Assignee: Mitsubishi Electric Corporation, Tokyo (JP)

( * ) Notice: Subject to any disclaimer, the term of this patent is extended or adjusted under 35 U.S.C. 154(b) by 720 days.

(21) Appl. No.: 14/085,024

(22) Filed: Nov. 20, 2013

(65) Prior Publication Data
US 2015/0135751 A1 May 21, 2015

(51) Int. Cl.
*F25D 21/06* (2006.01)
*F25B 13/00* (2006.01)
(Continued)

(52) U.S. Cl.
CPC ............ *F25B 49/022* (2013.01); *F25B 13/00* (2013.01); *F25B 49/005* (2013.01);
(Continued)

(58) Field of Classification Search
CPC .............. F25B 13/00; F25B 2313/0233; F25B 2313/0314; F25B 2313/0315; F25B 2400/13; F25B 2600/0253
(Continued)

(56) References Cited

U.S. PATENT DOCUMENTS 3,589,395 A * 6/1971 Bottum .................... F17C 13/00
137/592
3,779,035 A * 12/1973 Kramer ................. F25B 43/006
62/503
(Continued)

FOREIGN PATENT DOCUMENTS

EP 1 970 651 A1 9/2008
EP 2 653 806 A1 10/2013
(Continued)

OTHER PUBLICATIONS

International Search Report and Written Opinion mailed on Jul. 8, 2014 in corresponding International Application No. PCT/JP2014/001171 (in English).
(Continued)

*Primary Examiner* — Henry Crenshaw
(74) *Attorney, Agent, or Firm* — Posz Law Group, PLC

(57) ABSTRACT

The air-conditioning apparatus includes a compressor; a heat source side heat exchanger; a use side pressure-reducing mechanism; a use side heat exchanger and an accumulator connected by a pipe so that a refrigerant circulates therethrough; a high-low pressure bypass pipe; a high-low pressure bypass unit installed in the high-low pressure bypass pipe; and a unit controller configured to perform a refrigerant amount detection operation in which an operation frequency of the compressor is controlled so that a value of an evaporating temperature becomes an evaporating temperature target value of the compressor to discharge a liquid-state refrigerant of the refrigerant from the accumulator, and control an opening degree of the high-low pressure bypass unit in performing the refrigerant amount detection operation.

16 Claims, 6 Drawing Sheets

(51) Int. Cl.
*F25B 41/00* (2006.01)
*F25B 49/02* (2006.01)
*F25B 49/00* (2006.01)

(52) U.S. Cl.
CPC ............. *F25B 2313/0233* (2013.01); *F25B 2313/0314* (2013.01); *F25B 2313/0315* (2013.01); *F25B 2400/13* (2013.01); *F25B 2600/0253* (2013.01); *F25B 2600/0261* (2013.01); *F25B 2700/1931* (2013.01); *F25B 2700/1933* (2013.01); *F25B 2700/2103* (2013.01); *F25B 2700/2104* (2013.01); *F25B 2700/2106* (2013.01); *F25B 2700/21152* (2013.01); *Y02B 30/741* (2013.01)

(58) Field of Classification Search
USPC .................. 62/196.1, 156, 197, 160, 212
See application file for complete search history.

(56) References Cited

U.S. PATENT DOCUMENTS

| | | | | |
|---|---|---|---|---|
| 3,796,064 A | * | 3/1974 | Ladusaw | F25B 43/006 62/503 |
| 3,848,425 A | * | 11/1974 | Watkins | F25B 41/00 62/174 |
| 3,872,687 A | * | 3/1975 | Bottum | B60H 1/3204 62/243 |
| 3,922,875 A | * | 12/1975 | Morris, Jr. | F25B 40/00 62/156 |
| 4,122,688 A | * | 10/1978 | Mochizuki | F25B 5/02 62/196.1 |
| 4,557,115 A | * | 12/1985 | Nakamura | F25B 13/00 62/156 |
| 4,760,707 A | * | 8/1988 | Dennis | F25B 5/00 62/197 |
| 5,142,879 A | * | 9/1992 | Nakamura | F24F 3/065 62/160 |
| 5,987,907 A | * | 11/1999 | Morimoto | F25B 9/006 62/212 |
| 2009/0126375 A1 | | 5/2009 | Toyoshima et al. | |

FOREIGN PATENT DOCUMENTS

| | | |
|---|---|---|
| JP | 2007-187442 A | 7/2007 |
| JP | 2007-240108 A | 9/2007 |
| JP | 2011-133208 A | 7/2011 |
| JP | 2011-226704 A | 11/2011 |
| JP | 2012-255648 A | 12/2012 |
| WO | 2007/049372 A1 | 5/2007 |
| WO | 2008/035418 A1 | 3/2008 |
| WO | 2011/049767 A2 | 4/2011 |

OTHER PUBLICATIONS

Office Action mailed Feb. 28, 2017 issued in corresponding JP patent application No. 2016-503880 (and English translation).

* cited by examiner

F I G. 1 0
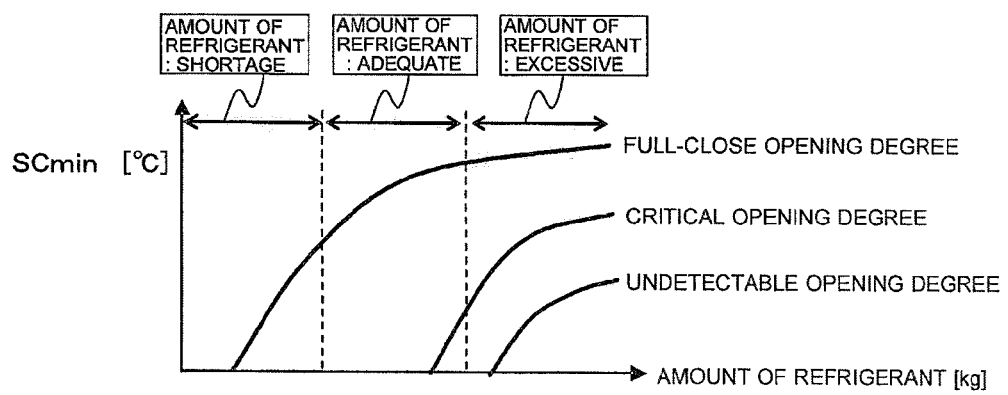

REFRIGERATION CYCLE APPARATUS

TECHNICAL FIELD

The present invention relates to a refrigeration cycle apparatus of steam compression type, to which at least one heat-source side unit and a plurality of use side units are connected. More specifically, the present invention relates to a refrigeration cycle apparatus configured to automatically detect an amount of refrigerant in the refrigerant circuit.

BACKGROUND ART

Refrigeration cycle apparatuses have been known in which a refrigerant circuit is formed by connecting a plurality of use side units to at least one heat-source side unit with refrigerant extension pipes. Refrigerant is injected to such type of refrigeration cycle apparatuses, in general, according to the lengths of the refrigerant extension pipes at the installation locations upon installation work of the units. However, defects may occur in the operational state of one such refrigeration cycle apparatus when the amount of filled refrigerant is inappropriate.

For example, when the amount of refrigerant is excessive, the pressure may increase in a refrigeration cycle apparatus with devices activating into a cooling operation under a high outdoor-air-temperature environment. The high pressure will invite an inevitable interruption for safety of the device operation, leaving a state in which the device operations are non-continuable. Contrarily, where the amount of refrigerant is short, the apparatus cannot obtain the desirable cooling or heating capacity for providing user comfort.

Hence, attempts have been made to develop technology of detecting whether an appropriate amount of refrigerant is filled in the refrigeration cycle apparatus (see, for example, Patent Literatures 1 and 2).

Patent Literature 1 discloses a method for determining the appropriateness in the amount of refrigerant filled in a refrigeration circuit. The method corrects the degree of supercooling by using a supercooling degree correction value, which is obtained by dividing the degree of supercooling by a value obtained by subtracting the outdoor temperature from the condensing temperature.

Patent Literature 2 discloses another method for determining the appropriateness in the amount of refrigerant filled in a refrigerant circuit. The method uses an equation representing the relationship between the amount of refrigerant in each part of a refrigerant circuit divided into a plurality of parts, and the amount of refrigerant flowing in the refrigerant circuit or an operational state amount of each constituent devices of the refrigerant circuit.

CITATION LIST

Patent Literature

[Patent Literature 1] Japanese Patent Application Laid-Open Publication No. 2012-255648 (see, for example, FIG. 3, paragraphs [0073]-[0081], etc.)
[Patent Literature 2] Japanese Patent Application Laid-Open Publication No. 2007-187442 (see, for example, FIG. 10, paragraphs [0141]-[0151], etc.)

SUMMARY OF INVENTION

Technical Problem

However, with the above-stated methods of determining the amount of refrigerant, an extended period of time is required when liquid-state refrigerant is stagnating in a liquid receiver of the refrigerant circuit, because the stagnating refrigerant has to be transferred to the high-pressure side of the refrigerant circuit by being evaporated. Typically, upon a periodical maintenance, which takes place after construction for installing a refrigeration cycle apparatus or after the activation thereof, workers visit the installation locations of the units of the refrigeration cycle. Where the workers have to know if the amount of refrigerant is appropriate and it takes time to detect the refrigerant amount, an elongated period of work will result that consumes time in the same day that can otherwise be reserved for a work in another site, for example.

This entails a conclusion that an increased number of workers are necessary for completing works in an increased number of such worksites in a limited period. Without increasing the number of workers, serviceability (number of worksites that can be provided with sufficient maintenance, or guarantee) would decrease. This issue is particularly problematic where the outdoor air temperature or the room air temperature is low, in which case the refrigerant temperature is decreased to result a reduced performance in heating the liquid-state refrigerant pooled in a liquid receiver, causing stagnation of the liquid-state refrigerant therein and taking a time to determine the amount of refrigerant. This leads to an elongated period of time for the work.

Moreover, in a system in which a plurality of heat-source side units are provided and heat-source side units other than the first-activated one are configured to activate in accordance with an increase in an operation frequency of the compressor of the first-activated unit, the refrigerant does not flow to those heat-source side units whose compressors have not been activated. Liquid-state refrigerant in a liquid receiver of one such unit is not discharged out of the liquid receiver. Therefore, it takes time to determine the amount of refrigerant where the activation of the compressor(s) of other-than-first-activated unit(s), due to a low outdoor air temperature or a low room air temperature. When the compressor(s) of other-than-first-activated unit(s) does (do) not activate due to the low outdoor-air or room-air temperature, the apparatus cannot detect the amount of refrigerant, resulting in the reduced performance in the maintenance (accuracy in determining the normality or defectiveness).

The present invention is made to overcome the above-described problems, and an object thereof is to provide a refrigeration cycle apparatus that can reduce the time for detection of the amount of refrigerant by shortening the time for discharging the liquid-state refrigerant from a liquid receiver (or accumulator).

Solution to Problem

A refrigeration cycle apparatus of the present invention comprises: a refrigerant circuit in which a compressor, a heat source side heat exchanger, a use side pressure-reducing mechanism, a use side heat exchanger and an accumulator are connected by a pipe so that a refrigerant circulates therethrough; a high-low pressure bypass pipe that connects a discharge side of the compressor and an entrance port of the accumulator; a high-low pressure bypass unit installed in the high-low pressure bypass pipe; a unit controller configured to perform a refrigerant amount detection operation in which an operation frequency of the compressor is controlled so that a value of an evaporating temperature becomes an evaporating temperature target value of the compressor to discharge a liquid-state refrigerant of the refrigerant from the accumulator, and control an opening degree of the high-low pressure bypass unit in performing the refrigerant amount detection operation.

Advantageous Effects of Invention

According to the refrigeration cycle of the present invention, the opening degree of the high-low pressure bypass unit is controlled upon performing the refrigerant amount detection operation. Therefore, it becomes possible to reduce the time for discharging the liquid-state refrigerant from the liquid receiver (accumulator), thereby shortening the refrigerant amount detection time.

BRIEF DESCRIPTION OF DRAWINGS

FIG. 10 is a schematic diagram showing the relationship between the degree of supercooling against the amount of refrigerant at opening degrees of the high-low pressure bypass pressure-reducing mechanism of the air-conditioning system according to Embodiment 3 of the present invention.

DESCRIPTION OF EMBODIMENTS

Figure 1:
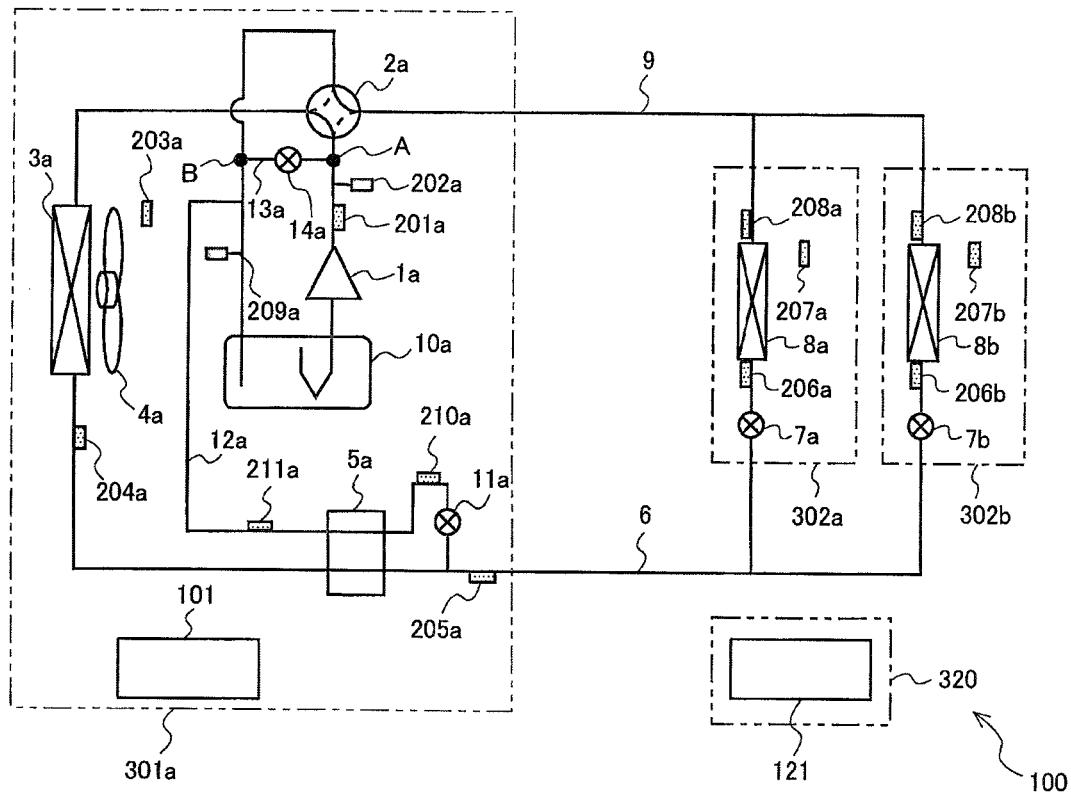
FIG. 1 is a refrigerant circuit diagram showing the refrigerant circuit configuration of an air-conditioning system according to Embodiment 1 of the present invention.

Referring to the drawings, the following describes embodiments of the present invention.

Embodiment 1

FIG. 1 is a refrigerant circuit diagram showing a refrigerant circuit configuration of the air-conditioning system 100 according to Embodiment 1 of the present invention. With reference to FIG. 1, explanations are given of the configuration and operation of the air-conditioning system 100 that is one example of the refrigeration cycle apparatus. Relations among the sizes or scales of elements may be different from actual ones in the drawings mentioned below, including FIG. 1.

The air-conditioning system 100 is installed, for example, in a building or an apartment or a trade facility, and can perform a cooling operation or a heating operation by performing a refrigeration cycle operation that circulates a refrigerant for air-conditioning by using steam compression.

<Configuration>

In the air-conditioning system 100, a heat-source side unit 301a, a use side unit 302a and a use side unit 302b are connected to liquid extension pipe 6 and a gas extension pipe 9 that are each refrigerant pipes. The numbers of heat-source side unit 301a, the use side unit 302a and the use side unit 302b may be greater than the examples shown in the drawings. The refrigerant used in the air-conditioning system 100 include, for example, R410A, R407C, R404A, R22, R32, R134a, HFO-1234yf, or natural refrigerant including hydrocarbon, Hellium and carbon dioxide.

The air-conditioning system 100 includes an external controller 320 comprising, for example, a laptop PC or a tablet type terminal PC, a cellular phone (including a smart phone) and can provide an instruction for operation or driving for the unit controller 101, and monitor the operational state.

<Heat-Source Side Unit 301a>

The heat-source side unit 301a supplies heating energy or cooling energy to the use side unit 302a and the use side unit 302b. The heat-source side unit 301a includes a compressor 1a, a four-way valve 2a, a heat source side heat exchanger 3a, a heat source side fan 4a, a supercooling heat exchanger 5a, an accumulator 10a, a liquid bypass pressure-reducing mechanism 11a, a liquid bypass pipe 12a, a high-low pressure bypass pipe 13a and a high-low pressure bypass pressure-reducing mechanism 14a.

The compressor 1a suctions a refrigerant, compresses it into a high-temperature, high-pressure state, and has a variable operation capacity. The four-way valve 2a is a refrigerant flow path change-over mechanism for switching the direction of flow of the refrigerant, and has first to fourth ports. The first port is connected to the discharge side of the compressor 1a, the second port is connected to the heat source side heat exchanger 3a, the third port is connected to the suction side of the compressor 1a, and the fourth port is connected to the gas extension pipe 9, respectively. The four-way valve 2a is configured to have a setting changeable between a state in which the first port and the second port communicate with the compressor 1 and, at the same time, the third port and the fourth port are closed (the state shown by a continuous line in FIG. 1), and a state in which the third port and the fourth port communicate with the compressor and at the same time the first port and the second port are closed (the state shown by a dashed lines in FIG. 1).

The heat source side heat exchanger 3a is configured as a fin and tube heat exchanger of cross fin type comprising, for example, a heat-transfer pipe and multiple fins, and heat is exchanged between the outdoor air and the refrigerant to exhaust the heat.

The heat source side fan 4a is configured to have variable rotation speed, supplies air to the heat source side heat exchanger 3a and comprises, for example, a propeller fan or the like. This heat source side fan 4a is installed in a position where it can supply air to the heat source side heat exchanger 3a.

The supercooling heat exchanger 5a is configured as a double tube heat exchanger; a low-pressure refrigerant having passed through the liquid bypass pressure-reducing mechanism 11a flows through the inner side on the sheet of the drawing (secondary side), and the high pressure refrigerant having passed through the heat source side heat exchanger 3a flows through the external side on the sheet of the drawing (primary side). Then, in the supercooling heat exchanger 5a, heat is exchanged between the high pressure refrigerant and the low-pressure refrigerant, cooling the high pressure refrigerant and heating the low-pressure refrigerant.

The accumulator 10a has a function of accumulating a refrigerant excessive for operation, and a function of preventing a large quantity of liquid-state refrigerant from entering the compressor 1a by temporarily retaining the liquid-state refrigerant when the operational state changes.

The liquid bypass pipe 12a connects between the high pressure liquid side of the supercooling heat exchanger 5a and the entrance port of the accumulator 10a. In the liquid bypass pipe 12a, the liquid bypass pressure-reducing mechanism 11a and the low-pressure side supercooling heat exchanger 5a are installed. The liquid bypass pressure-reducing mechanism 11a has variable opening degree, and can adjust the flow rate of the liquid-state refrigerant flowing to the use side unit 302a and the use side unit 302b.

The high-low pressure bypass pipe 13a connects between the connection point A between the discharge section of the compressor 1a and the heat source side heat exchanger 3a, and the connection point B between the gas extension pipe 9 and the entrance port of the accumulator 10a. A high-low pressure bypass pressure-reducing mechanism 14a (high-low pressure bypass unit) is installed on the high-low pressure bypass pipe 13a.

The high-low pressure bypass pressure-reducing mechanism 14a has variable opening degree, and adjusts the flow rate of the high pressure gas-state refrigerant discharged from the compressor 1a to be bypassed to the entrance port of the accumulator 10a.

The heat-source side unit 301a is provided with a pressure sensor 202a, a pressure sensor 209a, a temperature sensor 201a, a temperature sensor 204a, a temperature sensor 210a, a temperature sensor 211a, a temperature sensor 203a, and a temperature sensor 205a. Pressure information and temperature information obtained by measurement with the detection devices are input to the unit controller 101.

The pressure sensor 202a is provided for the discharge side of the compressor 1a, and measures the refrigerant pressure at the location at which it is installed. The pressure sensor 209a is provided in the upstream of the accumulator 10a, and measures the refrigerant pressure at the location at which it is installed.

The temperature sensor 201a is provided in the discharge side of the compressor 1a, and measures the refrigerant temperature at the location at which it is installed.

The temperature sensor 204a is provided for the liquid-side of the heat source side heat exchanger 3a, measures the refrigerant temperature at the location at which it is installed.

The temperature sensor 210a is provided between the liquid bypass pressure-reducing mechanism 11a and the low-pressure pipe of the supercooling heat exchanger 5a, and measures the refrigerant temperature at the location at which it is installed. The temperature sensor 211a is provided in the low-pressure side outlet side of the supercooling heat exchanger 5a, and measures the refrigerant temperature at the location at which it is installed.

The temperature sensor 203a is provided in the air inlet and measures the outdoor air temperature.

The temperature sensor 205a is provided between the supercooling heat exchanger 5a and the use side pressure-reducing mechanism 7a and the use side pressure-reducing mechanism 7b, and measures the refrigerant temperature at the location at which it is installed.

<Use Side Unit 302a, Use Side Unit 302b>

The use side unit 302a and use side unit 302b generate conditioned air by using heating energy or cooling energy supplied from the heat-source side unit 301a, delivers the conditioned air to the air-conditioning target space to perform the air-conditioning of the air-conditioning target space. The use side unit 302a and the use side unit 302b include the use side pressure-reducing mechanism 7a and the use side heat exchanger 8a, and the use side pressure-reducing mechanism 7b and the use side heat exchanger 8b, respectively.

The use side pressure-reducing mechanism 7a and the use side pressure-reducing mechanism 7b can control the flow rates of the refrigerant and have the variable opening degrees. The use side pressure-reducing mechanism 7a and the use side pressure-reducing mechanism 7b are provided between the supercooling heat exchanger 5a and the use side heat exchanger 8a, and between the supercooling heat exchanger 5a and the use side heat exchanger 8b.

The use side heat exchanger 8a and the use side heat exchanger 8b comprise, for example, a fin and tube heat exchanger of cross-fin type comprising a heat-transfer pipe and multiple fins, and exchanges heat between the indoor air and the refrigerant. The use side heat exchanger 8a and the use side heat exchanger 8b may exchange heat with a heat medium other than air (for example, water or brine, etc.) and the refrigerant.

The use side unit 302a and the use side unit 302b are provided with the temperature sensor 206a, the temperature sensor 208a and the temperature sensor 207a, and the temperature sensor 206b, the temperature sensor 208b, and the temperature sensor 207b, respectively. The temperature information obtained by measurement by any of the detection devices is input to the unit controller 101.

The temperature sensor 206a and the temperature sensor 206b are provided in the liquid sides of the use side heat exchanger 8a and the use side heat exchanger 8b, and detect the refrigerant temperatures at the locations at which they are installed.

The temperature sensor 208a and the temperature sensor 208b are provided in the gas sides of the use side heat exchanger 8a and use side heat exchanger 8b, and detect the refrigerant temperatures at the locations at which they are installed. The temperature sensor 207a and the temperature sensor 207b are provided at the air inlets, and measure the air temperatures at the locations at which they are installed.

<Unit Controller 101, Controller Controlling Device 121>

In the heat-source side unit 301a, for example, the unit controller 101 comprising a microcomputer is provided. However, the installation location of the unit controller 101 is not limited to the heat-source side unit 301a. The unit controller 101 may be configured to operate in conjunction wirelessly or via a cable with control units provided in the use side unit 302a and the use side unit 302b (not shown).

The external controller 320 is provided with, for example, a controller controlling device 121 implemented via S/W (software).

Figure 2:
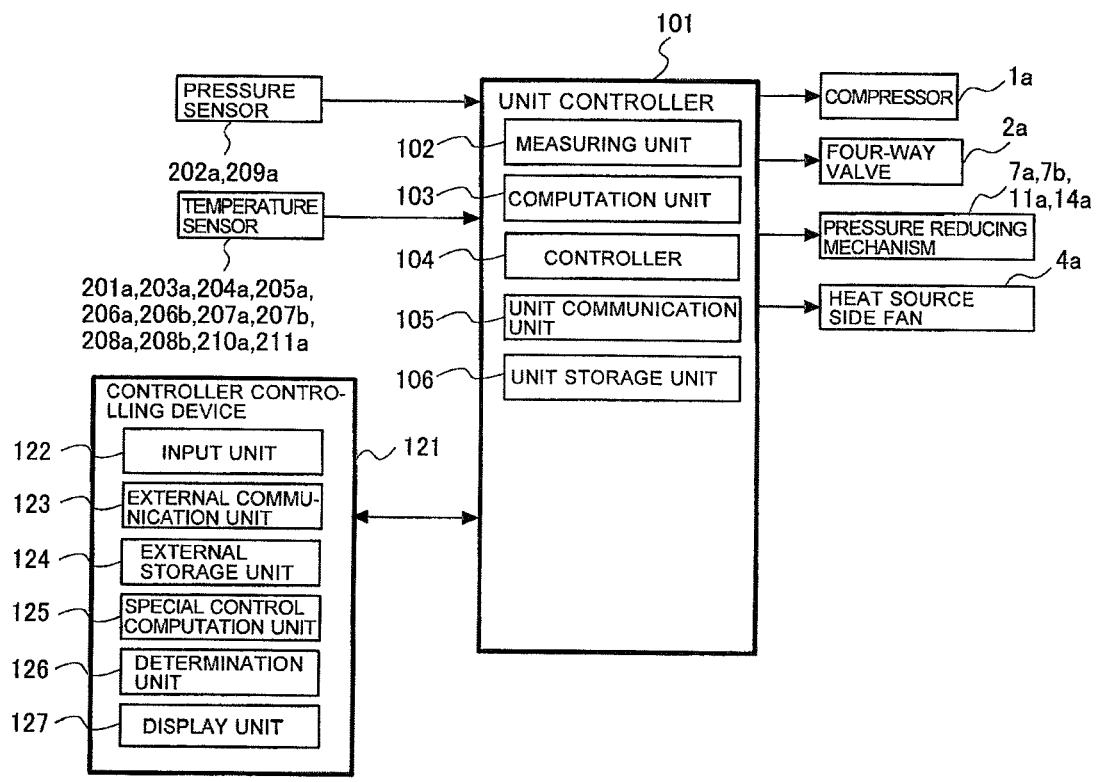
FIG. 2 is a block diagram showing the configuration of a unit controller and a controller controlling device of the air-conditioning system according to Embodiment 1 of the present invention.

FIG. 2 is a block diagram showing the configuration of the unit controller 101 and the controller controlling device 121 of the air-conditioning system 100. With reference to FIG. 2, explanation is given of the electrical configuration of the unit controller 101 and the controller controlling device 121 of the air-conditioning system 100.

The unit controller 101 performs computations for determining various control operation of each device including the compressor 1a and the heat source side fan 4a on the basis of the various amounts detected by each temperature sensor, and each pressure sensor to control each device. The unit controller 101 is provided with the measuring unit 102, the computation unit 103, the controller 104, the unit communication unit 105 and a unit storage unit 106.

The measuring unit 102 receives inputs including each of various amounts detected by each of the temperature sensors and the pressure sensors. The computation unit 103 executes computation for determining various control operations including, for example, calculating the saturation temperature at the detected pressure, on the basis of the information input to the measuring unit 102. The controller 104 controls each device on the basis of values computed by the computation unit 103.

The unit communication unit 105 receives inputs of communication data information via communication means including a telephone line, LAN, wireless communication or the like, and outputs information to the outside. For example, the unit communication unit 105 inputs, by communication, cooling instruction (cooling ON/OFF) or heating instruction (heating ON/OFF) output by a use side remote control (not shown) to the unit controller 101. Further, the unit communication unit 105 communicates measured value measured by the measuring unit 102, device control values computed by the computation unit 103 between itself and the controller controlling device 121. The unit storage unit 106 comprises, for example, a semiconductor memory, and stores setting values of each device, the values being used for the normal operation of the air-conditioning system 100.

The controller controlling device 121 comprises an input unit 122, an external communication unit 123, an external storage unit 124, a special control computation unit 125, a determination unit 126 and a display unit 127.

The input unit 122 receives, from the workers, inputs of start instruction of the refrigerant amount detection operation or designation of portions subjected to fault diagnosis.

The external communication unit 123 can receive inputs of communication data information from the communication means including a telephone line, LAN and wireless communication, and output the information to outside. The external communication unit 123 transmits, to the unit communication unit 105, the information input to the input unit 122 or control values of each device upon refrigerant amount detection operation, and receives operation data including pressure or temperature from the unit communication unit 105.

The external storage unit 124 is constituted of, for example, semiconductor memories or the like, and stores control setting values of each device of the air-conditioning system 100 in performing the refrigerant amount detection operation. The special control computation unit 125 computes control values of each device in performing the refrigerant amount detection operation. The determination unit 126 determines lack or excess of the amount of refrigerant, or appropriateness thereof. The determination unit 126 determines whether the operational state of the air-conditioning system 100 is stable. The display unit 127 is a display unit, such as a liquid crystal display mounted on the external controller 320, and displays the result of detection of refrigerant amount or displays the operational state of the air-conditioning system 100.

<Normal Operation>

The air-conditioning system 100 performs control of each device mounted on the heat-source side unit 301a, the use side unit 302a and the use side unit 302b according to the air-conditioning instruction requested from the use side unit 302a and the use side unit 302b. The air-conditioning system 100 performs, for example, cooling operation mode in accordance with the cooling instruction to the use side unit 302a or the use side unit 302b, or heating operation mode in accordance with the heating instruction of the use side unit 302a or the use side unit 302b. Hereafter, explanation is given of the normal operation of the air-conditioning system 100 (the cooling operation mode and the heating operation mode) with reference to FIG. 1.

<Cooling Operation Mode>

In the cooling operation mode, the four-way valve 2a connects the discharge side of the compressor 1a to the gas side heat source side heat exchanger 3a, and connects the suction side of the compressor 1a to the gas extension pipe 9 (shown as a continuous line in FIG. 1). The opening degree of the high-low pressure bypass pressure-reducing mechanism 14a is in the full-close degree.

The high-temperature, high-pressure gas-state refrigerant discharged from the compressor 1a enters the heat source side heat exchanger 3a through the four-way valve 2a, and transfers heat to the outdoor air blown by the heat source side fan 4a. This refrigerant is thereafter cooled by the low-pressure refrigerant by the supercooling heat exchanger 5a, and distributed to the liquid extension pipe 6 or the liquid bypass pipe 12a. The refrigerant having flowed to the liquid extension pipe 6 is subjected to pressure reduction by the use side pressure-reducing mechanism 7a and the use side pressure-reducing mechanism 7b to turn into a low-pressure, two-phase refrigerant and cool the indoor air at the use side heat exchanger 8a and the use side heat exchanger 8b to turn to the low-pressure gas-state refrigerant. Thereafter, the refrigerant passes through the gas extension pipe 9 and the four-way valve 2a to merge the refrigerant having flowed to the liquid bypass pipe 12a.

The refrigerant having flowed to the liquid bypass pipe 12a is subjected to pressure reduction at the liquid bypass pressure-reducing mechanism 11a, then heated by the high pressure refrigerant at the supercooling heat exchanger 5a, and thereafter merges with the refrigerant having flowed through the four-way valve 2a. The refrigerant having flowed to the liquid bypass pipe 12a, after the merge, flows to the accumulator 10a, and suctioned by the compressor 1a again.

The use side pressure-reducing mechanism 7a and the use side pressure-reducing mechanism 7b are controlled by the controller 104 so that the degrees of superheat at the use side heat exchanger 8a and the use side heat exchanger 8b take (a) predetermined value(s). The degrees of superheat at the use side heat exchanger 8a and the use side heat exchanger 8b are obtained by subtracting the detected temperatures of the temperature sensor 206a and the temperature sensor 206b from the detected temperatures of the temperature sensor 208a and the temperature sensor 208b. However, when the remote control connected to the use side unit 302b designates cooling OFF, the refrigerant is not flowed to the use side unit 302b so that cooling in the room where the use side unit 302b is disposed is stopped, the use side pressure-reducing mechanism 7b closes to the full-close opening degree. The same operation is performed when the remote control connected to the use side unit 302a designates cooling OFF.

The liquid bypass pressure-reducing mechanism 11a is controlled by the controller 104 so that the degree of superheat at the low-pressure side outlet of the supercooling heat exchanger 5a takes a predetermined value. The degree of superheat at the low-pressure side outlet of the supercooling heat exchanger 5a is obtained by subtracting the temperature detected by the temperature sensor 210a from the temperature detected by the temperature sensor 211a. The operation frequency of the compressor 1a is controlled by the controller 104 so that the value of the evaporating temperature takes a predetermined value (for example 0 degrees C.). The evaporating temperature is the saturation temperature at the pressure detected by the pressure sensor 209a. The rotation speed of the heat source side fan 4a is controlled by the controller 104 so that the value of condensing temperature takes a predetermined value (for example 40 degrees C.). The condensing temperature is a saturation temperature at the pressure detected by the pressure sensor 202a.

<Heating Operation Mode>

In the heating operation mode, the four-way valve 2a connects the discharge side of the compressor 1a to the gas extension pipe 9, and connects the suction side of the compressor 1a to the gas side heat source side heat exchanger 3a (shown as dashed lines in FIG. 1). The liquid bypass pressure-reducing mechanism 11a and the high-low pressure bypass pressure-reducing mechanism 14a are set to the full-close opening degrees.

The high-temperature, high-pressure gas-state refrigerant discharged from the compressor 1a flows to the gas extension pipe 9 through the four-way valve 2a, heats the indoor air at the use side heat exchanger 8a and the use side heat exchanger 8b to turn into the high pressure liquid-state refrigerant. This refrigerant is thereafter subjected to pressure reduction at the use side pressure-reducing mechanism 7a and the use side pressure-reducing mechanism 7b to turn into a low-pressure, two-phase refrigerant, passes through the liquid extension pipe 6, and enter the supercooling heat exchanger 5a. This refrigerant outflows from the supercooling heat exchanger 5a and enters the heat source side heat exchanger 3a. The refrigerant having entered the heat source side heat exchanger 3a receives heat from the outdoor air at the heat source side heat exchanger 3a to turn into the low-pressure gas-state refrigerant, passes through the accumulator 10a by way of the four-way valve 2a, and is suctioned again by the compressor 1a.

The use side pressure-reducing mechanism 7a and the use side pressure-reducing mechanism 7b are controlled by the controller 104 so that the degrees of supercooling at the use side heat exchanger 8a and the use side heat exchanger 8b take a predetermined value. The degrees of supercooling at the use side heat exchanger 8a and the use side heat exchanger 8b are obtained by subtracting the detected temperatures of the temperature sensor 206a and the temperature sensor 206b from the saturation temperature at the pressure detected by the pressure sensor 202a. The operation frequency of the compressor 1a is controlled by the controller 104 so that the value of condensing temperature takes a predetermined value. The rotation speed of the heat source side fan 4a is controlled by the controller 104 so that the value of evaporating temperature takes a predetermined value.

Explanation is given of the operation of the high-low pressure bypass pressure-reducing mechanism 14a upon the normal operation of the air-conditioning system 100. By opening the high-low pressure bypass pressure-reducing mechanism 14a, a part of the refrigerant discharged from the compressor 1a is bypassed to the suction part of the accumulator 10a. Therefore, the refrigerant flow rate at the heat source side heat exchanger 3a, the use side heat exchanger 8a and the use side heat exchanger 8b decreases. Consequently, the high-pressure-side pressure of the refrigerant decreases and the low-pressure-side pressure increases. Therefore, for example, the heating operation mode at a low outdoor air temperature, such as the outdoor air temperature of −20 degrees C., the low-pressure extremely decreases upon activation of the apparatus, and there may occur abnormality of low-pressure declining. However, by opening the high-low pressure bypass pressure-reducing mechanism 14a, a part of the refrigerant discharged from the compressor 1a can be bypassed to the inlet part of the accumulator 10a, and it becomes possible to suppress the decrease in the low-pressure-side pressure.

<Refrigerant Amount Detection Operation Mode to Perform Refrigerant Amount Checking>

Here, explanation is given of the refrigerant amount detection operation mode of the air-conditioning system 100. In general, upon construction for installing the air-conditioning system 100, periodical inspection or occurrence of defects, service persons (workers) visits the site in which the units are installed carrying the external controller 320 in which controller controlling device 121 is mounted, and performs maintenance work. There are many cases in the maintenance work where it is necessary to know if the amount of refrigerant in the system is appropriate. Therefore, by employing the refrigerant amount checking executed by the air-conditioning system 100 to grasp if the amount of refrigerant is appropriate, it becomes easy to determine whether the amount of refrigerant is short, excessive or appropriate.

First, the service persons inputs start of refrigerant amount detection operation mode to the input unit 122 of the controller controlling device 121. Then, the controller controlling device 121 transmits a device control value indicating start of the refrigerant amount detection mode to the unit communication unit 105 via the external communication unit 123. The unit controller 101, having received designation of the start of refrigerant amount detection operation mode, starts the refrigerant amount detection operation mode at the controller 104. After the start of operation, the control values of each device are computed by a special control computation unit 125 of the controller controlling device 121. The device control values are transmitted to the unit communication unit 105 via the external communication unit 123, and each device is controlled by the controller 104.

In contrast to the above-described normal operation, the refrigerant amount detection operation mode is a special mode of operation that is not performed in normal use of the air-conditioning system.

When a period elapses after the start of operation, the operational state becomes stable, and it is displayed whether the amount of refrigerant is appropriate, short or excessive on the display unit 127. The worker confirms the display content displayed on the display unit 127, supplements refrigerant where the amount of refrigerant is short, or discharges the refrigerant where the amount of refrigerant is excessive. Thereafter, when the completion of adjustment of refrigerant is input to the input unit 122 by the workers, and a period elapses and the operational state becomes stable, it is again displayed whether the amount of refrigerant is appropriate, and the adjustment of refrigerant amount is complete if appropriateness is displayed.

By using the refrigerant amount checking executed by the air-conditioning system 100, it becomes possible to determine the amount of refrigerant adjustment automatically and appropriately regardless of the experiences or levels of skills of the workers. Therefore, effectiveness in work will increase and factors of causing re-adjustment services after the work will be eliminated. For betterment of serviceability, it is desirable to shorten the time until it is displayed whether the amount of refrigerant is appropriate since the start of operation of the refrigerant amount detection mode, so that the time for work is shortened.

<Refrigerant Amount Detection Operation Mode>

In the refrigerant amount detection operation mode, since it is necessary to lay the accumulator 10a into a state where there is no liquid-state refrigerant, the normal operation is used as the basic operation in which the state of the refrigerant in the liquid extension pipe 6 is liquid-state. In Embodiment 1, since the level detection sensor is not installed in the accumulator 10a, it is not possible to obtain the amount of liquid-state refrigerant in the accumulator 10a from operation data. Therefore, in the air-conditioning system 100, each device is controlled on a basis of the cooling operation mode, since the refrigerant state in the liquid extension pipe 6 is liquid-state in the cooling operation mode, with no remaining liquid-state refrigerant in the accumulator 10a.

That is, the control of refrigerant flow and each device in this case is as follows. The high-temperature, high-pressure gas-state refrigerant discharged from the compressor 1a passes through four-way valve 2a to enter the heat source side heat exchanger 3a, and transfers heat to the outdoor air blown by the heat source side fan 4a. The refrigerant is thereafter cooled by the low-pressure refrigerant in the supercooling heat exchanger 5a, and distributed to the liquid extension pipe 6 or the liquid bypass pipe 12a. The refrigerant having flowed into the liquid extension pipe 6 is subjected to pressure reduction in the use side pressure-reducing mechanism 7a and the use side pressure-reducing mechanism 7b to be a low-pressure, two-phase refrigerant, cools the indoor air at the use side heat exchanger 8a and the use side heat exchanger 8b to be low-pressure gas-state refrigerant. The refrigerant thereafter passes through the gas extension pipe 9 and the four-way valve 2a and merges with the refrigerant having flowed through the liquid bypass pressure-reducing mechanism 11a.

On the other hand, the refrigerant having flowed to the liquid bypass pipe 12a, after being subjected to pressure reduction by the liquid bypass pressure-reducing mechanism 11a, is heated by the high pressure refrigerant in the supercooling heat exchanger 5a, and thereafter merges with the refrigerant having flowed through the four-way valve 2a. The refrigerant having flowed to the liquid bypass pipe 12a, after the merge, flows to the accumulator 10a and is suctioned by the compressor 1a again.

The use side pressure-reducing mechanism 7a and the use side pressure-reducing mechanism 7b are controlled by the controller 104 so that the values of degrees of superheat at the use side heat exchanger 8a and the use side heat exchanger 8b take predetermined values. The liquid bypass pressure-reducing mechanism 11a is controlled by the controller 104 so that the value of the degree of superheat at the low-pressure side outlet of the supercooling heat exchanger 5a takes a predetermined value. The operation frequency of the compressor 1a is controlled by the controller 104 so that the value of evaporating temperature takes a predetermined value (compressor evaporating temperature target value). The rotation speed of the heat source side fan 4a is controlled by the controller 104 so that the value of the condensing temperature takes a predetermined value.

The evaporating temperature is a saturation temperature at the pressure detected by the pressure sensor 209a (low-pressure-side pressure). Although the evaporating temperature is here the saturation temperature of the pressure detected by the pressure sensor 209a, the value is not limited to this but may be the saturation temperature of the pressure at any point in the refrigerant path from the use side pressure-reducing mechanism 7a and the use side pressure-reducing mechanism 7b to the entrance port of the compressor 1a or any temperature detected by the temperature sensor. The operation frequency of the compressor 1a is controlled by the controller 104 so as to increase where the evaporating temperature is higher than the evaporating temperature target value of the compressor and decrease where the evaporating temperature is smaller than the evaporating temperature target value of the compressor.

In the air-conditioning system 100, the operation is continued for a while, and it is determined whether the operational state is stabilized. The stable state of the operational state here refers to the operational state in which there is no remaining liquid-state refrigerant in the accumulator 10a and the refrigerant distribution among each device does not change (steady state). It is determined that the operational state is the stable state by the determination made by the determination unit 126 that each of the range of change in a predetermined time period of the degrees of supercooling SCHIC at the high pressure liquid sides of the use side pressure-reducing mechanism 7a, the use side pressure-reducing mechanism 7b and the supercooling heat exchanger 5a has become small (for example, the range of change in the degree of supercooling at the high pressure liquid side of the supercooling heat exchanger 5a in 10 minutes is ±1 degree C. or less).

Upon start of the refrigerant amount detection, the state of the liquid-state refrigerant is such that it is stagnating in the accumulator 10a. In order to achieve earlier determination of the amount of refrigerant, it is important to discharge the liquid-state refrigerant from the accumulator 10a as rapidly as possible.

The air-conditioning system 100 determines the amount of refrigerant after the operational state has become the stable state. In the case where the degree of supercooling SCHIC at the high pressure liquid side of the supercooling heat exchanger 5a is small, the state is displayed on the display unit 127 as refrigerant shortfall. On the other hand, where SCHIC is large, the state is displayed on the display unit 127 as the refrigerant excess. For example, where SCHIC<18 degrees C., the air-conditioning system 100 displays that the amount of refrigerant is short, and where 18≤SCHIC≤23, the air-conditioning system 100 displays that the amount of refrigerant is appropriate, while with SCHIC>23 degrees C. the air-conditioning system 100 displays that the amount of refrigerant is excessive.

The criterion for determination of the amount of refrigerant is not limited to the degree of supercooling at the high pressure liquid side of the supercooling heat exchanger 5a, but may be the degree of supercooling at the liquid side of the heat source side heat exchanger 3a. The degree of supercooling at the liquid side of the heat source side heat exchanger 3a is obtained by subtracting the temperature of the temperature sensor 204a from the saturation temperature at the pressure detected by the pressure sensor 202a.

Upon the cooling operation mode of the normal operation, when cooling OFF is designated on a remote control connected to the use side unit 302a and/or the use side unit 302b, the use side pressure-reducing mechanism 7a and the use side pressure-reducing mechanism 7b are set to the full-close opening degree so that the refrigerant does not flow therethrough.

On the other hand, in the refrigerant amount detection mode, regardless of cooling ON/OFF of the remote control, the use side pressure-reducing mechanism 7a and the use side pressure-reducing mechanism 7b are opened to control the degrees of superheat at the use side heat exchanger 8a and the use side heat exchanger 8b, thereby flowing the refrigerant to all of the use side heat exchanger 8a, and the use side heat exchanger 8b so that the refrigerant can be vaporized. With this configuration, since more heat sources for vaporization are secured than with not, it becomes earlier to heat the liquid-state refrigerant of the accumulator 10a, discharging the liquid-state refrigerant by vaporization is facilitated, and the operational state is stabilized earlier.

<Utilization of the High-Low Pressure Bypass Pressure-Reducing Mechanism 14a (High-Low Pressure Bypass Unit)>

Figure 3:
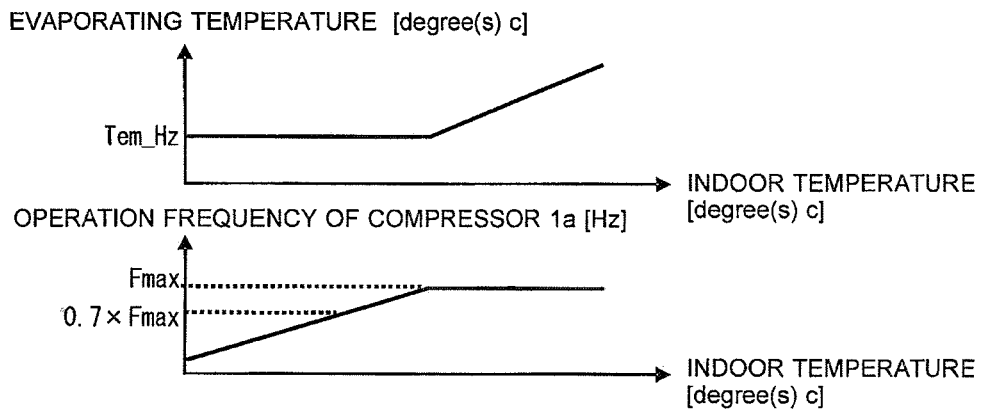
FIG. 3 is a schematic diagram showing the operational states under room air temperatures in performing the refrigerant amount detection operation of the air-conditioning system according to Embodiment 1 of the present invention.

Upon the construction for installation of the air-conditioning system 100, there may be cases where air-conditioning is not performed in intermediate seasons (for example, spring, autumn, etc.), in which, under a low room air temperature, determination has to be made of whether the amount of refrigerant is appropriate. FIG. 3 is a schematic diagram showing the operational state against the room air temperature in performing the refrigerant amount detection operation of the air-conditioning system 100.

With reference to FIG. 3, explanation is given of the operational state against the room air temperature in performing the refrigerant amount detection operation of the air-conditioning system 100.

As shown in FIG. 3, when the room air temperature becomes low, the evaporating temperature becomes low. From a point where the evaporating temperature is at such a low temperature as the target value Tem_Hz of the operation frequency of the compressor 1a, the operation frequency of the compressor 1a begins to decrease from the maximal operation frequency Fmax. Here, in particular, when the operation frequency of the compressor 1a decreases to, for example, 70% or less of Fmax, the evaporating temperature remains low transiently during the period from activation to the time when the operational state is stabilized. Therefore, the operation frequency of the compressor 1a is low, and the refrigerant flow rate in discharging from the compressor 1a is low.

Then, the amount of superheat gas-state refrigerant entering the accumulator 10a is small, and the capability for heating the liquid-state refrigerant being distributed in the accumulator 10a is low, and the velocity of discharging the liquid-state refrigerant decreases, and therefore it takes more time to reach the stable state of the operational state.

Figure 4:
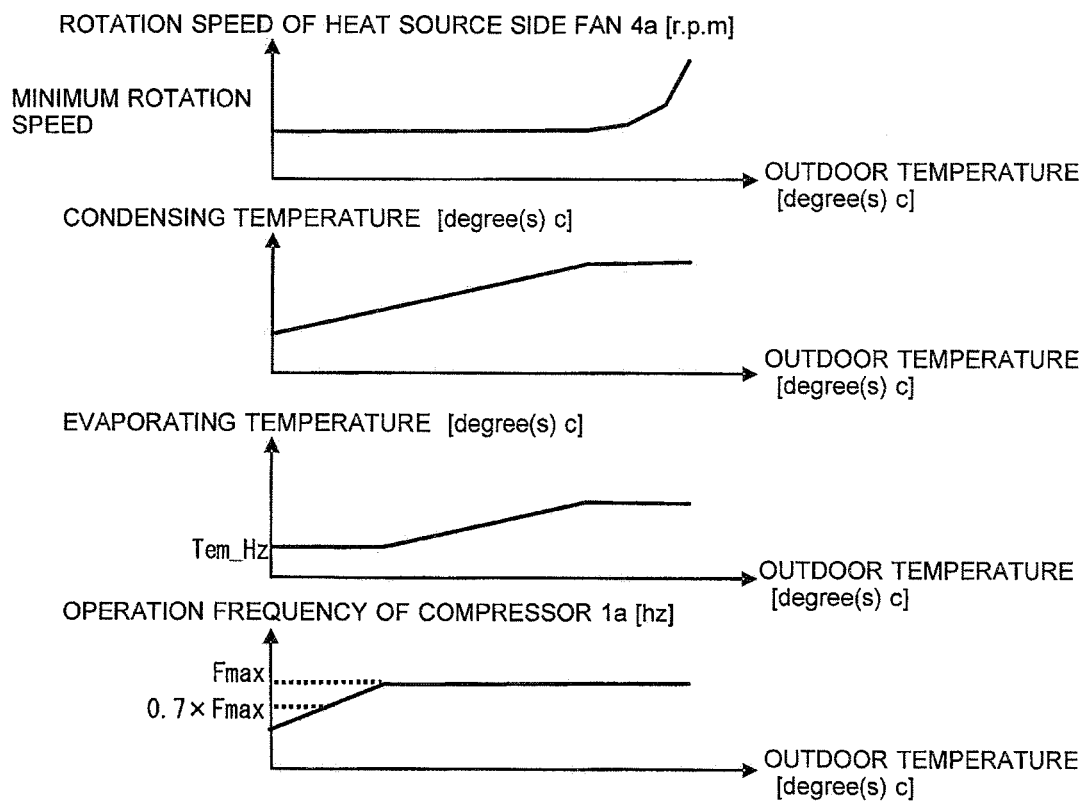
FIG. 4 is a schematic diagram showing the operational states under outdoor air temperatures (outdoor temperatures) of the air-conditioning system according to Embodiment 1 of the present invention in performing the refrigerant amount detection operation.

On the other hand, there may be cases where the outdoor air temperature is low upon maintenance performed for example, after a half-year from the installation construction, and determination has to be made of whether the amount of refrigerant is appropriate under such a low outdoor air temperature. FIG. 4 is a schematic diagram showing an operational state of the air-conditioning system 100 against the outdoor air temperature (outdoor temperature) in performing the refrigerant amount detection operation. With reference to FIG. 4, explanations are given of the operational state of the air-conditioning system 100 against the outdoor air temperature in performing the refrigerant amount detection operation.

As shown in FIG. 4, as the outdoor air temperature decreases, the rotation speed of the heat source side fan 4a decreases, and the evaporating temperature also decreases when the condensing temperature decreases to the point where the minimum rotation speed is reached. At a point where the outdoor temperature has decreased to the target value of the operation frequency of the compressor 1a, the operation frequency of the compressor 1a begins to decrease from the maximal operation frequency Fmax.

As described above, each device must be controlled so that the operation frequency of the compressor 1a does not become low where the air conditioning load is small in order that an elongated period of time is not required to discharge the liquid-state refrigerant out of the accumulator 10a. Here, the case where air conditioning load is small refers to the case where the room air temperature is low or the outdoor air temperature is low.

The air-conditioning system 100 bypasses the high temperature refrigerant discharged from the compressor 1a to the entrance port of the accumulator 10a, by opening the high-low pressure bypass pressure-reducing mechanism 14a to ensure the heating amount of the liquid-state refrigerant of the accumulator 10a, while suppressing the decrease of the low-pressure-side pressure to suppress the decrease of the flow rate of the refrigerant out of the compressor 1a. This configuration prevents elongation of the time for discharging the liquid-state refrigerant from the accumulator 10a. That is, where it is determined by the determination unit 126 that the room air temperature is low or the outdoor air temperature is low (where the air conditioning load is determined to be small), the high-low pressure bypass pressure-reducing mechanism 14a is opened.

Next, explanation is given of the method for controlling the high-low pressure bypass pressure-reducing mechanism 14a. A target value in control of the opening degree of the high-low pressure bypass pressure-reducing mechanism 14a is computed at the special control computation unit 125 based on the operation frequency of the compressor 1a, and the opening degree is controlled by the controller 104. More specifically, the opening degree of the high-low pressure bypass pressure-reducing mechanism 14a is gradually opened, for example, by the unit of 50 pulses until the operation frequency of the compressor 1a reaches or exceeds a frequency determined on the basis of the relationship with Fmax, that is, 70% of Fmax, and when the operation frequency of the compressor 1a reaches 70% of Fmax, the opening degree of the high-low pressure bypass pressure-reducing mechanism 14a is reduced for example, by the unit of 50 pulses. By changing the target value in control of the high-low pressure bypass pressure-reducing mechanism 14a based on the operation frequency of the compressor 1a, the operation frequency of the compressor 1a can reliably be increased.

Figure 5:
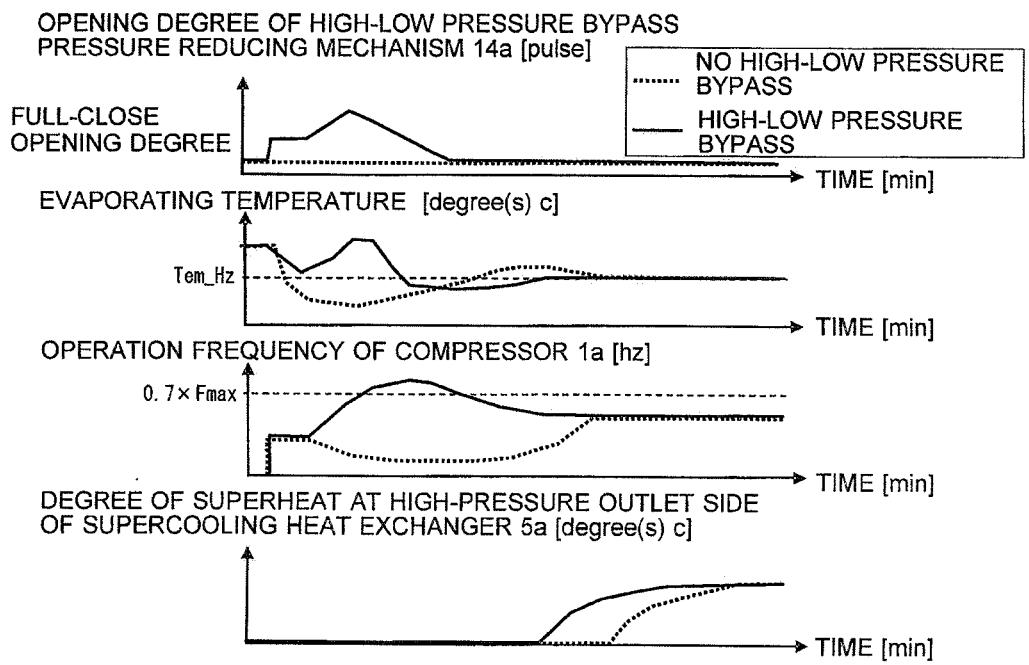
FIG. 5 is a schematic diagram showing differences, in the operational states where air conditioning load is small, between cases with and without high-low pressure bypass.

An explanation is given of how the operational state varies by implementing the high-low pressure bypass. FIG. 5 is a schematic diagram showing the difference in the operational state depending on the presence or absence of the high-low pressure bypass where the air conditioning load is small.

With reference to FIG. 5, an explanation is given of the difference in the operational state in the cases with presence and absence of the high-low pressure bypass when the air conditioning load is small.

Where there is no high-low pressure bypass (dashed line shown in FIG. 5), since the high-low pressure bypass pressure-reducing mechanism 14a is not opened, the evaporating temperature is significantly lower than the evaporating temperature target value Tem_Hz after the activation of the compressor 1a, and the operation frequency of the compressor 1a also decreases in accordance with the low evaporating temperature of the compressor 1a. Thereafter, as time passes while the apparatus is operating, the evaporating temperature gradually rises, and the operation frequency of the compressor 1a also increase to be stabilized at a substantially constant value. With further elapse of time, the degree of supercooling at the high-pressure side outlet of the supercooling heat exchanger 5a increases to be stabilized at a substantially constant value. Hence the operational state stabilizes. In this case, since the operation frequency of the compressor 1a decreases in the middle of the operation, the refrigerant flow rate temporarily decreases, and it takes a time until the degree of supercooling at the high-pressure side outlet of the supercooling heat exchanger 5a becomes stabilized.

On the other hand, with the high-low pressure bypass (the continuous line shown in FIG. 5), the high-low pressure bypass pressure-reducing mechanism 14a is open since the activation of the compressor 1a; the decrease in the evaporating temperature is suppressed and the evaporating temperature rises to be higher than the evaporating temperature target value Tem_Hz, so that the operation frequency of the compressor 1a increases. When the opening degree of the high-low pressure bypass pressure-reducing mechanism 14a is gradually increased, the evaporating temperature also increases so that the operation frequency of the compressor 1a increases. When the operation frequency of the compressor 1a reaches 70% of Fmax or greater, the high-low pressure bypass pressure-reducing mechanism 14a is gradually closed. When the high-low pressure bypass pressure-reducing mechanism 14a is closed, the evaporating temperature also decreases and the operation frequency of the compressor la decreases to be stabilized.

Thereafter, as time passes, the degree of supercooling at the high-pressure side outlet supercooling heat exchanger 5a increases to be at a substantially constant value. Hence the operational state stabilizes.

In this case, since the operation frequency of the compressor 1a does not decrease during the midway of the operation, there is no loss in the refrigerant flow rate. Moreover, with no decrease in the flow rate of the refrigerant flowing to the accumulator 10a, the loss in time until the liquid-state refrigerant is discharged exhaustively from the accumulator 10a is eliminated, so that the time until the degree of supercooling at the high-pressure side outlet supercooling heat exchanger 5a stabilizes becomes shortened.

Accordingly, by opening the high-low pressure bypass pressure-reducing mechanism 14a, it becomes possible to stabilize the operational state in an earlier stage than the case with not opening the high-low pressure bypass pressure-reducing mechanism 14a, so that the time from the start of the refrigerant amount detection to the output of refrigerant amount determination value is shortened. Therefore, it becomes possible to reduce the time for work, and the improvement of the serviceability is more likely to result. In the above, the operation frequency of the compressor 1a at which the operation of the high-low pressure bypass pressure-reducing mechanism 14a switches is stated as 70% of Fmax. However, the value is not limited to this, but may be 60% of Fmax. This value is stored in the external storage unit 124.

In the example with the high-low pressure bypass in FIG. 5, where the degree of supercooling at the high-pressure side outlet of the supercooling heat exchanger 5a has been stabilized at a predetermined value, and the operational state is stabilized, the opening degree of the high-low pressure bypass pressure-reducing mechanism 14a is at the full-close opening degree. Since it is the high temperature gas-state refrigerant that enters from the high-low pressure bypass pipe 13a to the entrance port of the accumulator 10a, not the liquid-state refrigerant, it is possible to determine the amount of refrigerant without turning the opening degree of the high-low pressure bypass pressure-reducing mechanism 14a to the full-close opening degree.

Figure 6:
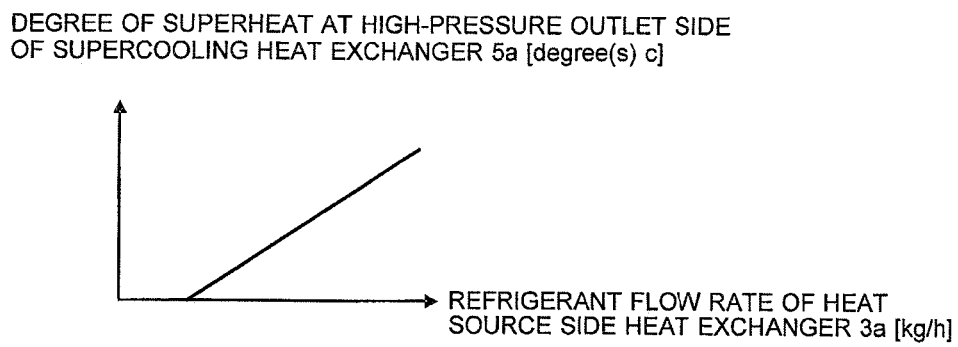
FIG. 6 is a schematic diagram showing the degree of supercooling at the high-pressure side outlet of a supercooling heat exchanger under a refrigerant flow rate of the heat source side heat exchanger upon refrigerant loading amount detection operation mode of the air-conditioning system according to Embodiment 1 of the present invention.

However, with the high-low pressure bypass pressure-reducing mechanism 14a kept open, the flow rate of the refrigerant through the heat source side heat exchanger 3a reduces, and the degree of supercooling at the high-pressure side outlet of supercooling heat exchanger 5a reduces as shown in FIG. 6. When the degree of supercooling at the high-pressure side outlet of the supercooling heat exchanger 5a reduces, it becomes necessary to determine whether the amount of refrigerant is appropriate with a small numeric value, so that the accuracy of refrigerant amount detection will decrease. Therefore, on determining the refrigerant amount, the full-close opening degree of the high-low pressure bypass pressure-reducing mechanism 14a yields more accuracy than in the case where the opening degree is set otherwise. FIG. 6 is a schematic diagram showing the degree of supercooling at the high-pressure side outlet of the supercooling heat exchanger 5a against the refrigerant flow rate through the heat source side heat exchanger 3a of the air-conditioning system 100 in a refrigerant loading amount detection operation mode.

Although it has been described that the opening degree of the high-low pressure bypass pressure-reducing mechanism 14a is controlled by the operation frequency of the compressor 1a, it may be controlled with other operational states. For example, the opening degree may be controlled in accordance with the evaporating temperature in the following manner.

In the case where the evaporating temperature is equal to or less than a pressure-reducing mechanism evaporating temperature target value, which is a target value in the evaporating temperature at the high-low pressure bypass pressure-reducing mechanism 14a, the high-low pressure bypass pressure-reducing mechanism 14a is opened. Contrarily, where it is higher than the pressure-reducing mechanism evaporating temperature target value, the refrigerant cycle apparatus throttles the high-low pressure bypass pressure-reducing mechanism 14a. The pressure-reducing mechanism evaporating temperature target value is set to be higher (for example, set to 2 degrees C.) than the evaporating temperature target value of the compressor 1a (for example, 0 degrees C.) until the operation frequency of the compressor la reaches 70% of Fmax. With this configuration, it is possible to increase the operation frequency of the compressor 1a while opening the high-low pressure bypass pressure-reducing mechanism 14a.

On the other hand, when the operation frequency of the compressor 1a has reached 70% of Fmax, the pressure-reducing mechanism evaporating temperature target value is set to be lower (for example, −2 degrees C.) than the evaporating temperature target value of the compressor 1a. With this configuration, it is possible to stabilize the operation frequency of the compressor 1a to a predetermined value while throttling the high-low pressure bypass pressure-reducing mechanism 14a.

By setting the target value in control of the high-low pressure bypass pressure-reducing mechanism 14a as the evaporating temperature, a control in more consideration of the refrigerant state is achieved than in the case where the operation frequency of the compressor $1a$ is used directly as the target value. For example, where the high-low pressure bypass pressure-reducing mechanism $14a$ is throttled by every predetermined, uniform opening degree, the low-pressure-side pressure (evaporating temperature) decreases extremely, and the operation frequency of the compressor $1a$ decreases, while the loss in the refrigerant flow rate can be avoided. On the other hand, where the target value of the high-low pressure bypass pressure-reducing mechanism $14a$ is set to the evaporating temperature, the high-low pressure bypass pressure-reducing mechanism $14a$ will open when the evaporating temperature becomes equal to or less than the target value (−2 degrees C. or under), so that the low-pressure-side pressure does not decrease, and the loss in the refrigerant flow rate can be avoided.

Although it has been described that it is determined on the basis of the air conditioning load whether to control the high-low pressure bypass pressure-reducing mechanism $14a$, the determination may be based on the state of the low-pressure-side pressure (evaporating temperature), after the air-conditioning system $100$ is activated.

More specifically, after the activation, where the evaporating temperature becomes equal to or lower than the evaporating temperature target value of the compressor $1a$ (for example, −2 degrees C. or under), the high-low pressure bypass pressure-reducing mechanism $14a$ is controlled to be opened from the full-close opening degree. With this configuration, although a more elongated period of refrigerant amount detection time is required than in the case where the high-low pressure bypass pressure-reducing mechanism $14a$ is opened before the activation for determination based on the air conditioning load, it is possible to avoid decrease of the refrigerant flow rate when the decrease in the high-pressure-side pressure and the decrease in the low-pressure-side pressure are caused by outside wind or the like to lower the operation frequency of the compressor $1a$. Furthermore, the low-pressure-side pressure (evaporating temperature) may be a saturation temperature or a temperature detected by the temperature sensor at any point in the refrigerant path from the use side pressure-reducing mechanism $7a$ and the use side pressure-reducing mechanism $7b$ to the entrance port of the compressor $1a$.

Furthermore, it is possible to shorten the refrigerant amount detection time when the high-low pressure bypass pressure-reducing mechanism $14a$ is controlled in accordance with the degree of supercooling at any point in the refrigerant path from the heat source side heat exchanger $3a$ to the use side pressure-reducing mechanism $7a$ and the use side pressure-reducing mechanism $7b$.

More specifically, where the degree of supercooling at the high-pressure side outlet of the supercooling heat exchanger $5a$ has become 3 degrees C. or higher when the high-low pressure bypass pressure-reducing mechanism $14a$ is opened since the activation in accordance with the control of the operation frequency of the compressor $1a$, the high-low pressure bypass pressure-reducing mechanism $14a$ is throttled at every predetermined time interval even if the operation frequency of the compressor $1a$ has not reached 70% of Fmax (for example, by the unit of 50 pulses).

Where the degree of supercooling at the high-pressure side outlet of the supercooling heat exchanger $5a$ becomes 3 degrees C. or higher when the high-low pressure bypass pressure-reducing mechanism $14a$ is opened in accordance with the control of the evaporating temperature, the pressure-reducing mechanism evaporating temperature target value of the compressor $1a$ is set to be smaller than the evaporating temperature target value even when the operation frequency of the compressor $1a$ does not reach 70% of Fmax, and the high-low pressure bypass pressure-reducing mechanism $14a$ is throttled.

Increase in the degree of supercooling means that a large part of the liquid-state refrigerant has been discharged from the accumulator $10a$, and the refrigerant distribution among each device in the refrigerant circuit is substantially stabilized. Therefore, the operation frequency of the compressor $1a$ does not decrease even when the high-low pressure bypass pressure-reducing mechanism $14a$ is throttled. Where the refrigerant amount detection operation is performed at the time, for example in the evening, when just only the outdoor air temperature condition has transited to one in which the temperature thereof is low from the high air temperature conditions, a large amount of refrigerant is distributed in the heat source side heat exchanger $3a$ or the liquid extension pipe $6$. This is the state in which the liquid-state refrigerant has been discharged from the accumulator $10a$ in a short time. At this time, when the control is performed on the high-low pressure bypass pressure-reducing mechanism $14a$ in accordance with the degree of supercooling, it is possible to throttle the high-low pressure bypass pressure-reducing mechanism $14a$ in consideration of the completion of discharging the liquid-state refrigerant from the accumulator $10a$. Therefore, the time period until the refrigerant determination display is shortened, and it becomes possible to finish the refrigerant amount detection operation at an early stage.

Figure 7:
FIG. 7 is a schematic diagram showing operational states of the use side pressure-reducing mechanism against the opening degree of the high-low pressure bypass pressure-reducing mechanism of the air-conditioning system according to Embodiment 1 of the present invention.
Figure 7:

When the opening degree of the high-low pressure bypass pressure-reducing mechanism $14a$ is too large, it becomes not possible to discharge the refrigerant from the accumulator $10a$. Therefore, the opening degree of the high-low pressure bypass pressure-reducing mechanism $14a$ needs to be controlled so as not to be open too largely. FIG. 7 is a schematic diagram showing the operational states of the use side pressure-reducing mechanism $7a$ and the use side pressure-reducing mechanism $7b$ against the opening degree of the high-low pressure bypass pressure-reducing mechanism $14a$ of the air-conditioning system $100$.

As shown in FIG. 7, when the high-low pressure bypass pressure-reducing mechanism $14a$ is gradually opened, the refrigerant flow rates of the use side heat exchanger $8a$ and the use side heat exchanger $8b$ decrease. Therefore, the use side pressure-reducing mechanism $7a$ and the use side pressure-reducing mechanism $7b$ are throttled. When the high-low pressure bypass pressure-reducing mechanism $14a$ is further opened, the minimum opening degree in control is ultimately reached, in which case the opening degrees of the use side pressure-reducing mechanism $7a$ the use side pressure-reducing mechanism $7b$ cannot be decreased any more. In this case, the degrees of superheat of the use side pressure-reducing mechanism $7a$ and the use side pressure-reducing mechanism $7b$ at the outlets thereof decrease to 0 degrees C., and the refrigerant containing liquid-state refrigerant begins to flow to the accumulator $10a$ from the use side heat exchanger $8a$, and the use side heat exchanger $8b$. In such a state, there is a possibility that the liquid-state refrigerant is mixed in the entrance port of the accumulator $10a$, and it takes a time to discharge the liquid-state refrigerant from the accumulator $10a$.

Therefore, it is necessary to control the high-low pressure bypass pressure-reducing mechanism $14a$ in accordance with the degrees of superheat at the use side heat exchanger $8a$ and the use side heat exchanger $8b$. More specifically, where the degrees of superheat at the use side heat exchanger $8a$ and the use side heat exchanger $8b$ becomes 2 degrees C. or under, the high-low pressure bypass pressure-reducing mechanism 14a is throttled (for example by 50 pulses). With this configuration, it is possible to avoid the decrease in the degrees of superheat at the use side heat exchanger 8a and the use side heat exchanger 8b by the opening of the high-low pressure bypass pressure-reducing mechanism 14a. Therefore, there occurs no flow of the refrigerant containing liquid-state refrigerant from the use side heat exchanger 8a, and the use side heat exchanger 8b to the accumulator 10a, eliminating the necessity of the elongated time to discharge the liquid-state refrigerant from the accumulator 10a.

Moreover, similarly, by opening the high-low pressure bypass pressure-reducing mechanism 14a, the opening degree of the liquid bypass pressure-reducing mechanism 11a decreases, and the degree of superheat at the low-pressure side outlet of the supercooling heat exchanger 5a becomes 0 degrees C. Therefore, also in the case where the degree of superheat at the low-pressure side outlet supercooling heat exchanger 5a becomes 2 degrees C. or under, the high-low pressure bypass pressure-reducing mechanism 14a is throttled (for example by 50 pulses). As described above, the high-low pressure bypass pressure-reducing mechanism 14a is controlled so that the degree of superheat at the low-pressure side, that is, the degree of superheat at any point in the refrigerant path from the outlets of the use side heat exchanger 8a and the use side heat exchanger 8b to the entrance port of the accumulator 10a or in the refrigerant path from the low-pressure side outlet of the supercooling heat exchanger 5a to the entrance port of the accumulator 10a becomes 2 degrees C. or higher.

With this configuration, no elongated period of time is required to discharge the liquid-state refrigerant from the accumulator 10a, and it becomes possible to display the result of refrigerant amount detection at an early stage, and to shorten the time for work.

Embodiment 2

Figure 8:
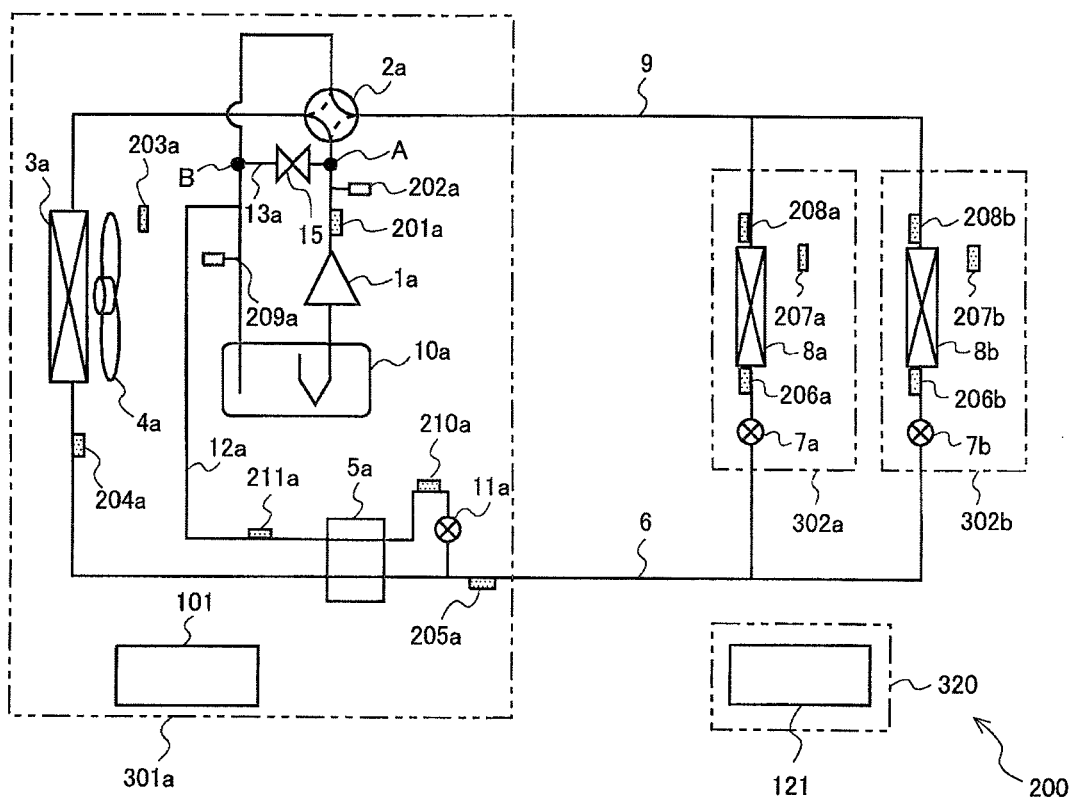
FIG. 8 is a refrigerant circuit diagram showing the refrigerant circuit configuration of an air-conditioning system according to Embodiment 2 of the present invention.

FIG. 8 is a refrigerant circuit diagram showing the refrigerant circuit configuration of the air-conditioning system 200 according to Embodiment 2 of the present invention. With reference to FIG. 8, the configuration and operation of the air-conditioning system 200, which is one example of the refrigeration cycle apparatus will be described. In Embodiment 2, explanation is given mainly of the difference from the above-described Embodiment 1, and points same as those of Embodiment 1 are omitted with same signs adhered thereto.

Similarly to the air-conditioning system 100 according to Embodiment 1, the air-conditioning system 200 is installed, for example, in a building, an apartment or a trade facility, and performs refrigeration cycle operation to circulate the refrigerant for air-conditioning by steam compression, and can thereby perform a cooling operation or a heating operation.

<Device Configuration>

The only difference in the air-conditioning system 200 from the air-conditioning system 100 according to Embodiment 1 is a high-low pressure bypass solenoid valve 15 provided in place of the high-low pressure bypass pressure-reducing mechanism 14a, and other device configurations or circuit configurations are same as Embodiment 1. That is, in the air-conditioning system 200 according to Embodiment 2, the high-low pressure bypass unit is the high-low pressure bypass solenoid valve 15.

<Operation>

Embodiment 2 is same as Embodiment 1 except for the part of the high-low pressure bypass solenoid valve 15, that is, the device control method of the refrigerant amount detection operation mode, the method for determination of the stable state of the operational state, and the method for determining the amount of refrigerant, and the determination of starting the control of the high-low pressure bypass solenoid valve 15 (the air conditioning load is small or the low-pressure-side pressure has decreased).

<Control of the High-Low Pressure Bypass Solenoid Valve 15>

The method for controlling the high-low pressure bypass solenoid valve 15 will be described.

Where the high-low pressure bypass solenoid valve 15 is controlled in accordance with the operation frequency of the compressor 1a is, similarly to Embodiment 1, the high-low pressure bypass solenoid valve 15 is opened since the activation until the operation frequency of the compressor 1a reaches 70% of Fmax, and the high-low pressure bypass solenoid valve 15 is closed when the operation frequency of the compressor 1a reaches 70% of Fmax.

On the other hand, where the high-low pressure bypass solenoid valve 15 is controlled in accordance with the evaporating temperature, the manner of control is as follows. That is, the solenoid valve evaporating temperature target value that is the target value in the evaporating temperature of the high-low pressure bypass solenoid valve 15 is set to be (for example −4 degrees C.) lower than the evaporating temperature target value of the compressor 1a (for example 0 degrees C.), the high-low pressure bypass solenoid valve 15 is opened where the evaporating temperature is lower than the solenoid valve evaporating temperature target value. Where the high-low pressure bypass solenoid valve 15 is opened, the solenoid valve evaporating temperature target value is set to be (for example, 4 degrees C.) higher than the evaporating temperature target value of the compressor 1a, and when the evaporating temperature exceeds the solenoid valve evaporating temperature target value, the high-low pressure bypass solenoid valve 15 is closed.

With the above configuration, even when the high-low pressure bypass unit is the solenoid valve as in the case of Embodiment 2, it is possible to suppress the decrease of the operation frequency of the compressor 1a due to the decrease of the low-pressure-side pressure, in the same way as Embodiment 1 in which the high-low pressure bypass unit is the pressure-reducing mechanism. Therefore, also in Embodiment 2, the time to discharge the liquid-state refrigerant from the accumulator 10a is shortened, and it is possible to shorten the time for the refrigerant amount detection.

Embodiment 3

Figure 9:
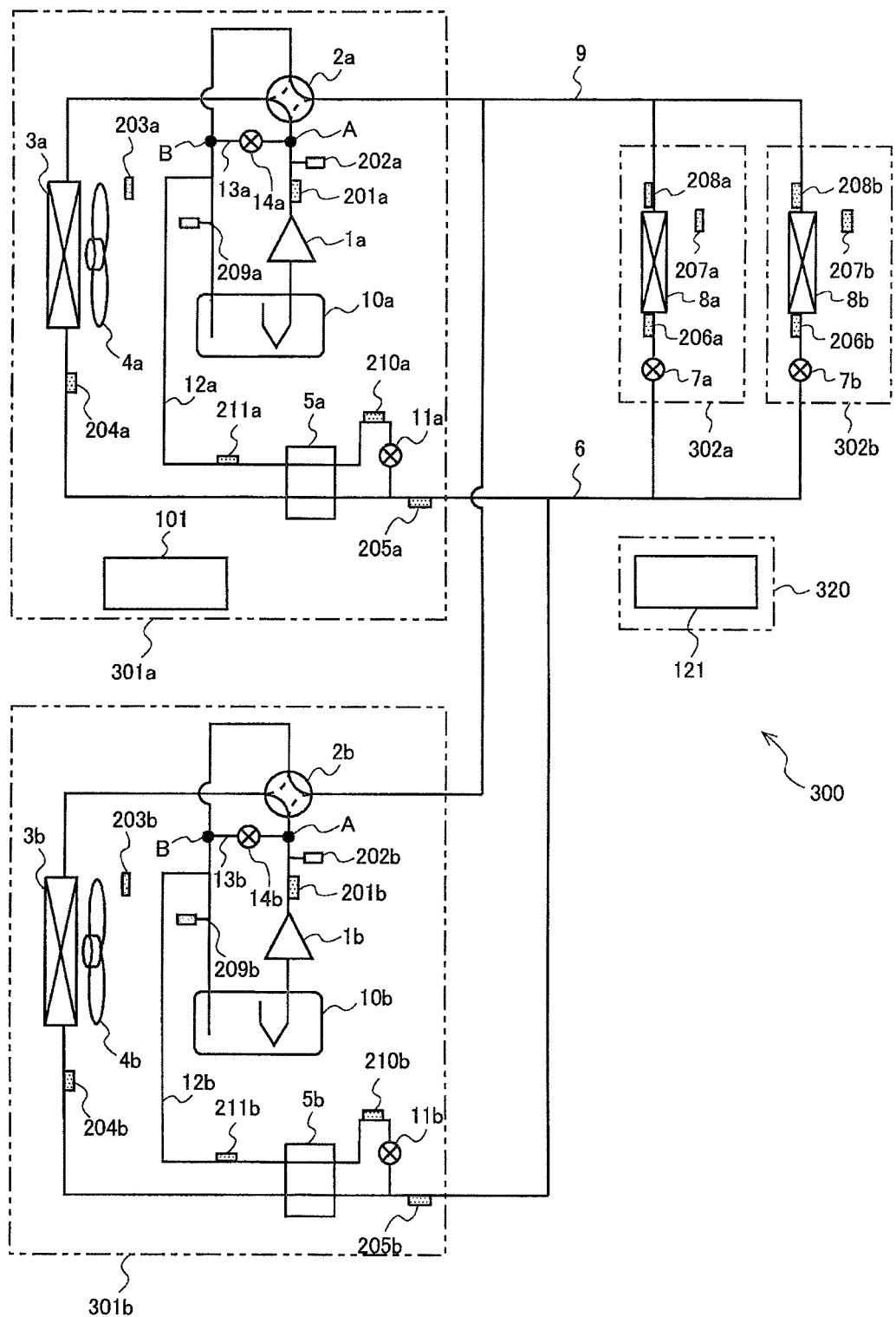
FIG. 9 is a refrigerant circuit diagram showing the refrigerant circuit configuration of the air-conditioning system according to Embodiment 3 of the present invention.

FIG. 9 is a refrigerant circuit diagram showing the refrigerant circuit configuration of the air-conditioning system 300 according to Embodiment 3 of the present invention. With reference to FIG. 9, the configuration and operation of the air-conditioning system 300, which is one example of the refrigeration cycle apparatus will be described. In Embodiment 3, the difference from above-described Embodiment 1 is mainly described, and the explanations for the points that are the same as Embodiment 1, are omitted with the same signs adhered thereto.

The air-conditioning system 300, in the same way as the air-conditioning system 100 according to Embodiment 1, is installed, for example, in the building, apartment, or a trade facility, performs the refrigeration cycle operation to circulate the refrigerant for air-conditioning by steam compression, and thereby can perform a cooling operation or a heating operation.

[Apparatus Configuration]

In the air-conditioning system 300, a heat-source side unit 301b that has the same circuit configuration as the heat-source side unit 301a described in Embodiment 1 is connected to the use side unit 302a and the use side unit 302b in parallel with the heat-source side unit 301a. That is, the heat-source side unit 301a and the heat-source side unit 301b are connected with the liquid extension pipe 6 and the gas extension pipe 9 that are refrigerant pipes to the use side unit 302a and the use side unit 302b, respectively. For convenience, the devices associated with the heat-source side unit 301b are indicated by sign "b" adhered thereto, so as to be distinguished from the devices associated with the heat-source side unit 301a.

The air-conditioning system 300 controls each device installed in the heat-source side unit 301a, the heat-source side unit 301b, the use side unit 302a and the use side unit 302b, in accordance with the air-conditioning instruction requested from the use side unit 302a and the use side unit 302b. Then, the air-conditioning system 300, for example, performs cooling operation mode in accordance with the cooling instruction to the use side unit 302a and the use side unit 302b, or the heating operation mode in accordance with the heating instruction to the use side unit 302a and the use side unit 302b. Hereafter, the normal operation of the air-conditioning system 300 (cooling operation mode, and the heating operation mode) will be described.

<Cooling Operation Mode>

In the cooling operation mode, the four-way valve 2a connects the discharge side of the compressor 1a to the gas side of the heat source side heat exchanger 3a, and connects the suction side of the compressor 1a to the gas extension pipe 9 (shown as the continuous line in FIG. 9). The high-low pressure bypass pressure-reducing mechanism 14a is set to the full-close opening degree. The four-way valve 2b connects the discharge side of the compressor 1b to the gas side of the heat source side heat exchanger 3b, and connects the suction side of the compressor 1b to the gas extension pipe 9 (shown as the continuous line in FIG. 9). The high-low pressure bypass pressure-reducing mechanism 14b is set to the full-close opening degree.

Upon start of the cooling operation mode, only the compressor 1a is activated with the compressor 1b being stopped. Here the method for activating the compressor 1b will be described. After operation for a while, the compressor 1b is activated after the operation frequency of the compressor 1a reaches a second-compressor-activation frequency or greater, the refrigerant is flowed to the heat-source side unit 301b. Here, the second-compressor-activation frequency refers, for example, to the same value as the maximal operation frequency Fmaxa of the compressor 1a. The operation frequency at activation of the compressor 1b is set to the half of the operation frequency of the compressor 1a. Furthermore, at activation of the compressor 1b, the operation frequency of the compressor 1a is reduced into half.

With this configuration, a total operation frequency, which is the total of the operation frequency of the compressor 1a and the operation frequency of the compressor 1b does not change before and after the second-activated compressor, to prevent the flow rate of the refrigerant flowing to the use side unit 302a and the use side unit 302b from varying extremely, and prevent the operational state from being unstable.

Contrarily, where the compressor 1b has been activated and the total operation frequency becomes a second-compressor-stop frequency or less, the compressor 1b is stopped, and the operation frequency of the compressor 1a is doubled. Here, the second-compressor-stop frequency refers to a value that is 40% of the total value of the maximal operation frequency Fmaxa of the compressor 1a and the maximal operation frequency Fmaxb of the compressor 1b (0.4*(Fmaxa+Fmaxb)).

Next, the refrigerant flow will be described.

The high-temperature, high-pressure gas-state refrigerant discharged from the compressor 1a passes through the four-way valve 2a to enter the heat source side heat exchanger 3a, and transfers heat to the outdoor air blown by the heat source side fan 4a. This refrigerant is thereafter cooled by the low-pressure refrigerant at the supercooling heat exchanger 5a, and is distributed to the liquid extension pipe 6 or the liquid bypass pipe 12a. The refrigerant having flowed to the liquid extension pipe 6 is subjected to pressure reduction at the use side pressure-reducing mechanism 7a and the use side pressure-reducing mechanism 7b to be a low-pressure, two-phase refrigerant, cooling the indoor air at the use side heat exchanger 8a and the use side heat exchanger 8b to be the low-pressure gas-state refrigerant. Thereafter, by way of the gas extension pipe 9 and the four-way valve 2a, the refrigerant merges with the refrigerant having flowed through the liquid bypass pressure-reducing mechanism 11a.

On the other hand, the refrigerant having flowed to the liquid bypass pipe 12a, after being subjected to pressure reduction at the liquid bypass pressure-reducing mechanism 11a, is heated by the high pressure refrigerant at the supercooling heat exchanger 5a, and thereafter, merges with the refrigerant having flowed through the four-way valve 2a. The refrigerant having flowed to the liquid bypass pipe 12a, after the merge, flows to the accumulator 10a and is suctioned by the compressor 1a again.

Where the compressor 1a has turned into the second-compressor-activation frequency, the operation of the compressor 1b is started. The high-temperature, high-pressure gas-state refrigerant discharged from the compressor 1b passes through the four-way valve 2b to enter the heat source side heat exchanger 3b and transfers heat to the outdoor air blown by the heat source side fan 4b. This refrigerant is thereafter cooled by the low-pressure refrigerant at the supercooling heat exchanger 5b, and separated to flow in the liquid extension pipe 6 or the liquid bypass pipe 12b. The refrigerant having flowed to the liquid extension pipe 6 is subjected to pressure reduction at the use side pressure-reducing mechanism 7a and the use side pressure-reducing mechanism 7b to be a low-pressure, two-phase refrigerant, cooling the indoor air in the use side heat exchanger 8a and the use side heat exchanger 8b to be a low-pressure gas-state refrigerant. Thereafter, the refrigerant passes through the gas extension pipe 9 and the four-way valve 2b and merges with the refrigerant having flowed through the liquid bypass pressure-reducing mechanism 11b.

On the other hand, the refrigerant having flowed the liquid bypass pipe 12b is heated by the supercooling heat exchanger 5b by the high pressure refrigerant after pressure reduction in the liquid bypass pressure-reducing mechanism 11b, and thereafter merges with the refrigerant having flowed through the four-way valve 2b. The refrigerant having flowed through the liquid bypass pipe 12b, after the merge, flows to the accumulator 10b, and is suctioned again by the compressor 1b.

In the liquid bypass pressure-reducing mechanism 11a, the degree of superheat at the low-pressure side outlet of the supercooling heat exchanger 5a is controlled at the controller 104 so as to be a predetermined value.

Further, in the liquid bypass pressure-reducing mechanism 11b, the degree of superheat at the low-pressure side outlet supercooling heat exchanger 5b is controlled in the controller 104 to be a predetermined value. The operation frequency of the compressor 1a is controlled by the controller 104 so that the evaporating temperature (evaporating temperature at the heat-source side unit 301a) that is the saturation temperature at the pressure detected by the pressure sensor 209a becomes a predetermined value. The operation frequency of the compressor 1b is controlled in accordance with the evaporating temperature that is the saturation temperature at the pressure detected by the pressure sensor 209b (the evaporating temperature at the heat-source side unit 301b).

The rotation speed of the heat source side fan 4a is controlled by the controller 104 so that the condensing temperature that is the saturation temperature at the pressure detected by the pressure sensor 202a (heat-source side unit 301a condensing temperature) becomes the predetermined value. The rotation speed of the heat source side fan 4b is controlled by the controller 104 so that the condensing temperature that is the saturation temperature at the pressure detected by the pressure sensor 202b (condensing temperature at the heat-source side unit 301b) becomes a predetermined value.

<Refrigerant Amount Detection Operation Mode>

Also in Embodiment 3, each device is controlled on the basis of the cooling operation mode in the same way as Embodiment 1. Upon the start of the refrigerant amount detection operation mode, only the compressor 1a is activated, and the compressor 1b is not activated until the operation frequency of the compressor 1a reaches or exceeds the second-compressor-activation frequency. The refrigerant does not flow to the compressor 1b or the accumulator 10b in the state where the compressor 1b is not activated, and it is impossible to discharge the liquid-state refrigerant from the accumulator 10b, and therefore it is impossible to appropriately determine the amount of refrigerant.

Where the air conditioning load is small, an elongated period of time is required for the operation frequency of the compressor 1a to increase, and the time since the activation of the air-conditioning system until the compressor 1b is activated, and the refrigerant amount detection time get long. Then, in Embodiment 3, the time until the compressor 1b is activated is reduced by controlling the high-low pressure bypass pressure-reducing mechanism 14a and the high-low pressure bypass pressure-reducing mechanism 14b, to shorten the refrigerant amount detection time.

Where the air conditioning load is determined to be small, the high-low pressure bypass pressure-reducing mechanism 14a opens when the compressor 1a is activated by the start of the refrigerant amount detection operation mode. Thereafter, the high-low pressure bypass pressure-reducing mechanism 14a is controlled in accordance with the operation frequency of the compressor 1a or the evaporating temperature of the heat-source side unit 301a. When the operation frequency of the compressor 1a increases to reach or exceed the second-compressor-activation frequency or greater, the compressor 1b is activated. By opening the high-low pressure bypass pressure-reducing mechanism 14a, the decrease in the evaporating temperature of the heat-source side unit 301a is suppressed, so that the operation frequency of the compressor 1a increases rapidly than in the case where it is not opened, and the time until the activation of the compressor 1b will be shortened.

By the activation of the compressor 1b, the flow rate of the refrigerant flowing to the refrigerant circuit of the air-conditioning system 300 increases, and the flow rate of the refrigerant flowing to the accumulator 10a and the accumulator 10b increases, so that discharging of the liquid-state refrigerant is facilitated. Therefore, control is performed such that the high-low pressure bypass pressure-reducing mechanism 14a is throttled when the compressor 1b is activated. That is, the high-low pressure bypass pressure-reducing mechanism 14a is opened where the compressor 1b is stopped, and where the compressor 1b is activated, the high-low pressure bypass pressure-reducing mechanism 14a is throttled.

For example, where the high-low pressure bypass pressure-reducing mechanism 14a is controlled in accordance with the evaporating temperature, when the compressor 1b is stopped, the pressure-reducing mechanism evaporating temperature target value of the high-low pressure bypass pressure-reducing mechanism 14a is set to be lower than the evaporating temperature target value of the compressor 1a (for example, set as −2 degrees C.). Then, where the compressor 1b is activated, the pressure-reducing mechanism evaporating temperature target value of the high-low pressure bypass pressure-reducing mechanism 14a is set to be lower than the evaporating temperature target value of the compressor 1a (set to −2 degrees C., for example).

After the activation of the compressor 1b, since the high-low pressure bypass pressure-reducing mechanism 14a is closed gradually, it takes a time to reach the full-close opening degree. If, during the period in which high-low pressure bypass pressure-reducing mechanism 14a is open, when the high-low pressure bypass pressure-reducing mechanism 14b is closed, the flow rates of the refrigerant flowing to the heat source side heat exchanger 3a and the heat source side heat exchanger 3b become unbalanced. Therefore, the flow rates of the refrigerant flowing to the heat-source side unit 301a and the heat-source side unit 301b become different from each other, the refrigerant flow rates of the accumulator 10a and the accumulator 10b become different from each other.

Then, when the liquid-state refrigerant on the one of the accumulator 10a and the accumulator 10b is discharged therefrom, the liquid-state refrigerant in the other remains and it takes a time for the liquid-state refrigerant to be discharged. In order to avoid such a state, at activation of the compressor 1b, the high-low pressure bypass pressure-reducing mechanism 14b is opened so that its opening degree is to be greater than the opening degree of the high-low pressure bypass pressure-reducing mechanism 14a, and thereafter, the pressure-reducing mechanism evaporating temperature target value of the high-low pressure bypass pressure-reducing mechanism 14b is set to be (for example, −2 degrees C.) lower than the evaporating temperature target value of the compressor 1b. With this configuration, the lack of balance between the amount of the refrigerant flowing in the heat source side heat exchanger 3a and that in the heat source side heat exchanger 3b is eliminated, so that the refrigerant flow rates of the accumulator 10a and the accumulator 10b become the same.

By controlling the opening degree of the high-low pressure bypass pressure-reducing mechanism 14a and the high-low pressure bypass pressure-reducing mechanism 14b, it becomes possible to discharge the liquid-state refrigerant from the accumulator 10a and the accumulator 10b in a short time even in a system in which a plurality of heat-source side units are provided as in Embodiment 3, the operational state can be stabilized in a short time. Therefore, the refrigerant amount detection time is shortened, and it becomes possible to shorten the time for work.

Furthermore, in a system in which a plurality of heat-source side units are installed as in the air-conditioning system 300, even when the total operation frequency does not increase to be the second-compressor-activation frequency where the high-low pressure bypass pressure-reducing mechanism 14a and the high-low pressure bypass pressure-reducing mechanism 14b are not opened, so that it becomes possible to temporarily increase the total operation frequency to be the second-compressor-activation frequency by opening the high-low pressure bypass pressure-reducing mechanism 14a and the high-low pressure bypass pressure-reducing mechanism 14b. Thereafter, if the total operation frequency does not decrease to be the second-compressor-stop frequency or under, it is the state in which both the compressor 1a and the compressor 1b are activated, and the amount of refrigerant can be detected.

That is, the smallest value of the total operation frequency at which the refrigerant amount can be detected in the case where the high-low pressure bypass pressure-reducing mechanism 14a and the high-low pressure bypass pressure-reducing mechanism 14b are not opened is the second-compressor-activation frequency. By contrast, when the high-low pressure bypass pressure-reducing mechanism 14a and the high-low pressure bypass pressure-reducing mechanism 14b are open, the smallest value of the total operation frequency at which the refrigerant amount detection can be performed is the second-compressor-stop frequency, so that the total operation frequency range, that is, the range of air conditioning load, in which the amount of refrigerant can be detected, is enlarged. Therefore, according to the air-conditioning system 300, since the range of air conditioning load in which the refrigerant amount can be detected is enlarged, the maintenance performance of the apparatus can be improved.

Here, in the state where the operational state is stabilized with the high-low pressure bypass pressure-reducing mechanism 14a and the high-low pressure bypass pressure-reducing mechanism 14b being turned to the full-close opening degree, when the total operation frequency becomes lower than the second-compressor-stop frequency, the compressor 1b is turned to the stopped state, and the refrigerant stagnates in the heat-source side unit 301b. It is not possible to ensure the accuracy in the determination of the amount of refrigerant that is required in the actual operation. Then, by controlling the high-low pressure bypass pressure-reducing mechanism 14a and the high-low pressure bypass pressure-reducing mechanism 14b, it becomes possible to avoid such a state.

More specifically, in the state in which both the compressor 1a and the compressor 1b are activated, where the total operation frequency is smaller than the minimum control frequency that is the value obtained by adding a predetermined frequency to the second-compressor-stop frequency (for example, second-compressor-stop frequency +10 Hz), the high-low pressure bypass pressure-reducing mechanism 14a and the high-low pressure bypass pressure-reducing mechanism 14b are controlled so that the total operation frequency becomes the minimum control frequency. That is, where the total operation frequency becomes the minimum control frequency or under, the high-low pressure bypass pressure-reducing mechanism 14a and the high-low pressure bypass pressure-reducing mechanism 14b are opened by a predetermined opening degree (for example, 50 pulses) to avoid the decrease in the low-pressure-side pressure, the decrease in the operation frequency of the compressor 1a, and the compressor 1b is avoided.

With this configuration, since the total operation frequency becomes higher than the case where the high-low pressure bypass pressure-reducing mechanism 14a and the high-low pressure bypass pressure-reducing mechanism 14b are set to the full-close opening degree, it is possible to prevent the compressor 1b from stopping and the refrigerant amount detection can be performed even when the air conditioning load is small.

However, when the high-low pressure bypass pressure-reducing mechanism 14a and the high-low pressure bypass pressure-reducing mechanism 14b are opened, the flow rate of the refrigerant flowing to the heat source side heat exchanger 3a and the heat source side heat exchanger 3b decreases, and the high-pressure-side pressure (condensing temperature) reduces. Therefore, the degrees of supercooling in the range from the heat source side heat exchanger 3a and the heat source side heat exchanger 3b to the use side pressure-reducing mechanism 7a and the use side pressure-reducing mechanism 7b reduce. For example, SCHICmin reduces that is the smaller one of: the degree of supercooling at the high-pressure side outlet of the supercooling heat exchanger 5a; and the degree of supercooling at the high-pressure side outlet of the supercooling heat exchanger 5b. Here, the degree of supercooling at the high-pressure side outlet of the supercooling heat exchanger 5a is obtained by subtracting the temperature detected by the temperature sensor 205a from the saturation temperature at the pressure detected by the pressure sensor 202a. Furthermore, the degree of supercooling at the high-pressure side outlet supercooling heat exchanger 5b is obtained by subtracting the temperature detected by the temperature sensor 205b from the saturation temperature at the detected pressure sensor 202b.

FIG. 10 is a schematic diagram showing the relationship between the amount of refrigerant against the degree of supercooling in the opening degree of the high-low pressure bypass pressure-reducing mechanism 14a and the high-low pressure bypass pressure-reducing mechanism 14b of the air-conditioning system 300 (a total value of the high-low pressure bypass pressure-reducing mechanism 14a and the high-low pressure bypass pressure-reducing mechanism 14b). Where the opening degrees of the high-low pressure bypass pressure-reducing mechanism 14a and the high-low pressure bypass pressure-reducing mechanism 14b are the full-close opening degrees, the degree of supercooling SCmin is 0 degrees C. or higher even when the amount of refrigerant is short, and it is possible not only to determine the appropriateness of the amount of refrigerant, but also the degree of shortage of the amount of refrigerant based on the value of SCmin, and it is possible to determine the amount of refrigerant with high accuracy.

When the high-low pressure bypass pressure-reducing mechanism 14a and high-low pressure bypass pressure-reducing mechanism 14b open so that the opening degree reaches the critical opening degree, SCmin becomes 0 degrees C. in the whole range in which the amount of refrigerant is appropriate. Although the amount of refrigerant becomes unknown, since SCmin becomes 0 degrees C. or higher, it becomes possible to determine the appropriateness of the amount of refrigerant from value of SCmin. When the opening degrees of the high-low pressure bypass pressure-reducing mechanism 14a and the high-low pressure bypass pressure-reducing mechanism 14b reach the opening degree in which the detection is not possible, SCmin becomes 0 degrees C. in the whole range in which the amount of refrigerant is appropriate, and therefore it becomes not possible to determine the appropriateness of the amount of refrigerant from SCmin.

Accordingly, the opening degrees of the high-low pressure bypass pressure-reducing mechanism 14a and the high-low pressure bypass pressure-reducing mechanism 14b are controlled with the upper limits of the opening degrees of the high-low pressure bypass pressure-reducing mechanism 14a and the high-low pressure bypass pressure-reducing mechanism 14b taken as the critical opening degrees. That is, the air conditioning load in which the total operation frequency becomes the minimum control frequency, and the high-low pressure bypass pressure-reducing mechanism 14a and the high-low pressure bypass pressure-reducing mechanism 14b have the critical opening degree is the minimum air conditioning load in which the refrigerant amount can be detected in Embodiment 3. The critical opening degree is a value determined upon the test in the development of the apparatus, and stored in advance in the external storage unit 124.

In this way, in a system in which a plurality of heat-source side units are installed in the air-conditioning system 300 according to Embodiment 3, by opening the opening degrees of the high-low pressure bypass pressure-reducing mechanism 14a and the high-low pressure bypass pressure-reducing mechanism 14b when the operational state becomes stable and the amount of refrigerant is determined in such a degree in which the refrigerant has the degree of supercooling, the maintenance performance will be improved as compared to the case otherwise.

When the high-low pressure bypass pressure-reducing mechanism 14a and the high-low pressure bypass pressure-reducing mechanism 14b are in the open state when the operational state is stabilized, the degree of supercooling SCmin changes due to the high-low pressure bypass pressure-reducing mechanism 14a and the high-low pressure bypass pressure-reducing mechanism 14b. Therefore, the opening degrees of the high-low pressure bypass pressure-reducing mechanism 14a and the high-low pressure bypass pressure-reducing mechanism 14b are added as the criteria for determining the stability of the operational state. That is, it is determined that the range of change of the opening degree of the high-low pressure bypass pressure-reducing mechanism 14a, high-low pressure bypass pressure-reducing mechanism 14b in a predetermined time period has become (for example, the range of change in 10 minutes has become ±10 pulses or under in the determination unit 126.

With this configuration, the opening degrees of the high-low pressure bypass pressure-reducing mechanism 14a and the high-low pressure bypass pressure-reducing mechanism 14b do not change and it is possible to perform the determination of the amount of refrigerant in a state in which the degree of supercooling SCmin is stable, and the accuracy of refrigerant amount detection is improved, and the maintenance performance improves.

In place of the high-low pressure bypass pressure-reducing mechanism 14a and the high-low pressure bypass pressure-reducing mechanism 14b, a high-low pressure bypass solenoid valve may be used as a high-low pressure bypass unit as explained in Embodiment 2.

REFERENCE SIGNS LIST 1a compressor, 1b compressor, 2a four-way valve, 2b four-way valve, 3a heat source side heat exchanger, 3b heat source side heat exchanger, 4a heat source side fan, 4b heat source side fan, 5a supercooling heat exchanger, 5b supercooling heat exchanger, 6 liquid extension pipe, 7a use side pressure-reducing mechanism, 7b use side pressure-reducing mechanism, 8a use side heat exchanger, 8b use side heat exchanger, 9 gas extension pipe, 10a accumulator, 10b accumulator, 11a liquid bypass pressure-reducing mechanism, 11b liquid bypass pressure-reducing mechanism, 12a liquid bypass pipe, 12b liquid bypass pipe, 13a high-low pressure bypass pipe, 13b high-low pressure bypass pipe, 14a high-low pressure bypass pressure-reducing mechanism, 14b high-low pressure bypass pressure-reducing mechanism, 15 high-low pressure bypass solenoid valve, 100 air-conditioning system, 101 unit controller, 102 measuring unit, 103 computation unit, 104 controller, 105 unit communication unit, 106 unit storage unit, 121 controller controlling device, 122 input unit, 123 external communication unit, 124 external storage unit, 125 special control computation unit, 126 determination unit, 127 display unit, 200 air-conditioning system, 201a temperature sensor, 202a pressure sensor, 202b pressure sensor, 203a temperature sensor, 204a temperature sensor, 205a temperature sensor, 205b temperature sensor, 206a temperature sensor, 206b temperature sensor, 207a temperature sensor, 207b temperature sensor, 208a temperature sensor, 208b temperature sensor, 209a pressure sensor, 209b pressure sensor, 210a temperature sensor, 211a temperature sensor, 300 air-conditioning system, 301a heat-source side unit, 301b heat-source side unit, 302a use side unit, 302b use side unit, 320 external controller.

The invention claimed is:

1. A refrigeration cycle apparatus comprising:
a refrigerant circuit in which a compressor, a heat source side heat exchanger, a use side pressure-reducing mechanism, a use side heat exchanger and an accumulator are connected by a pipe so that a refrigerant circulates therethrough;
a high-low pressure bypass pipe that connects a discharge side of the compressor and an entrance port of the accumulator;
a high-low pressure bypass unit installed in the high-low pressure bypass pipe, and
a unit controller configured to control the refrigerant cycle apparatus to perform a normal operation mode in which air conditioning is performed and a maintenance refrigerant-amount detection operation mode in which the unit controller is configured to
control an operation frequency of the compressor upon starting the maintenance refrigerant-amount detection operation mode so that a value of an evaporating temperature becomes a first evaporating temperature target value and control an opening degree of the high-low pressure bypass unit to vaporize a liquid-state refrigerant of the refrigerant in the accumulator, and
determine an amount of the refrigerant after controlling the operation frequency of the compressor and the opening degree of the high-low pressure bypass unit.

2. The refrigeration cycle apparatus of claim 1, wherein the unit controller controls the opening degree of the high-low pressure bypass unit on a basis of an air conditioning load during the maintenance refrigerant-amount detection operation mode.

3. The refrigeration cycle apparatus of claim 1, wherein the unit controller throttles the opening degree of the high-low pressure bypass unit when the operation frequency of the compressor reaches or exceeds a frequency determined on a basis of a relationship with a maximal operation frequency of the compressor during the maintenance refrigerant-amount detection operation mode.

4. The refrigeration cycle apparatus of claim 1, wherein the unit controller, upon starting the maintenance refrigerant-amount detection operation mode, opens the high-low pressure bypass unit when the value of the evaporating temperature becomes a second evaporating temperature target value or less, and throttles the high-low pressure bypass unit when the value of the evaporating temperature is higher than the second evaporating temperature target value.

5. The refrigeration cycle apparatus of claim 1, wherein the unit controller changes a target value in control of the high-low pressure bypass unit in accordance with the operation frequency of the compressor during the maintenance refrigerant-amount detection operation mode.

6. The refrigeration cycle apparatus of claim 1, wherein the unit controller controls the opening degree of the high-low pressure bypass unit on a basis of a degree of supercooling at a point in a refrigerant path from the heat source side heat exchanger to the use side pressure-reducing mechanism during the maintenance refrigerant-amount detection operation mode.

7. The refrigeration cycle apparatus of claim 1, wherein the unit controller controls the opening degree of the high-low pressure bypass unit on a basis of a degree of superheat at a point in a refrigerant path from the use side heat exchanger to the accumulator during the maintenance refrigerant-amount detection operation mode.

8. The refrigeration cycle apparatus of claim 1, further comprising:
a plurality of use side units each including a respective use side pressure-reducing mechanism and a respective use side heat exchanger, and performing temperature conditioning of respective at least one air-conditioning target space, wherein
each respective use side pressure-reducing mechanism of the plurality of use side units is opened in all the use side units, in performing the maintenance refrigerant-amount detection operation mode.

9. The refrigeration cycle apparatus of claim 1, further comprising:
a plurality of heat source side units each including a respective compressor, a respective heat source side heat exchanger, a respective accumulator and a respective high-low pressure bypass unit, wherein
the unit controller controls the opening degree of each respective high-low pressure bypass unit of the plurality of heat source side units in performing the maintenance refrigerant-amount detection operation mode where each respective compressor is activated in all of the heat-source side units.

10. The refrigeration cycle apparatus of claim 9, wherein the unit controller, when, in performing the maintenance refrigerant-amount detection operation mode, the compressor has been activated in one of the heat-source side units and the compressor is activated in another of the heat-source side units, controls the opening degree of the high-low pressure bypass unit of the another of the heat source side units to be equal to or greater than the opening degree of the high-low pressure bypass unit of the one of the heat-source side units.

11. The refrigeration cycle apparatus of claim 9, wherein the unit controller controls the opening degree of the high-low pressure bypass unit so that when the operational state is stable in performing the maintenance refrigerant-amount detection operation mode, a degree of supercooling at any point in the refrigerant path between the heat source side heat exchanger and the use side pressure-reducing mechanism is prevented from being predetermined value or under.

12. The refrigeration cycle apparatus of claim 1, wherein the unit controller determines that the operational state is stable when the opening degree of the high-low pressure bypass unit is stabilized in performing the maintenance refrigerant-amount detection operation mode.

13. The refrigeration cycle apparatus of claim 1, wherein the high-low pressure bypass unit comprises a high-low pressure bypass pressure-reducing mechanism or a high-low pressure bypass solenoid valve.

14. The refrigeration cycle apparatus of claim 4, wherein the second evaporating temperature target value is set to be higher than the first evaporating temperature target value in a case where the operation frequency of the compressor is lower than a threshold value, and
the second evaporating temperature target value is set to be lower than the first evaporating temperature target value in a case where the operation frequency of the compressor is equal to or higher than the threshold value.

15. The refrigeration cycle apparatus of claim 1, wherein the unit controller outputs information on the determined amount of refrigerant to a display unit.

16. The refrigeration cycle apparatus of claim 1, wherein the maintenance refrigerant-amount detection operation mode is different from the normal operation mode.

* * * * *